July 14, 1936. M. E. HAUSHEER 2,047,505
ACCOUNTING TYPEWRITER
Filed April 10, 1931 13 Sheets-Sheet 1
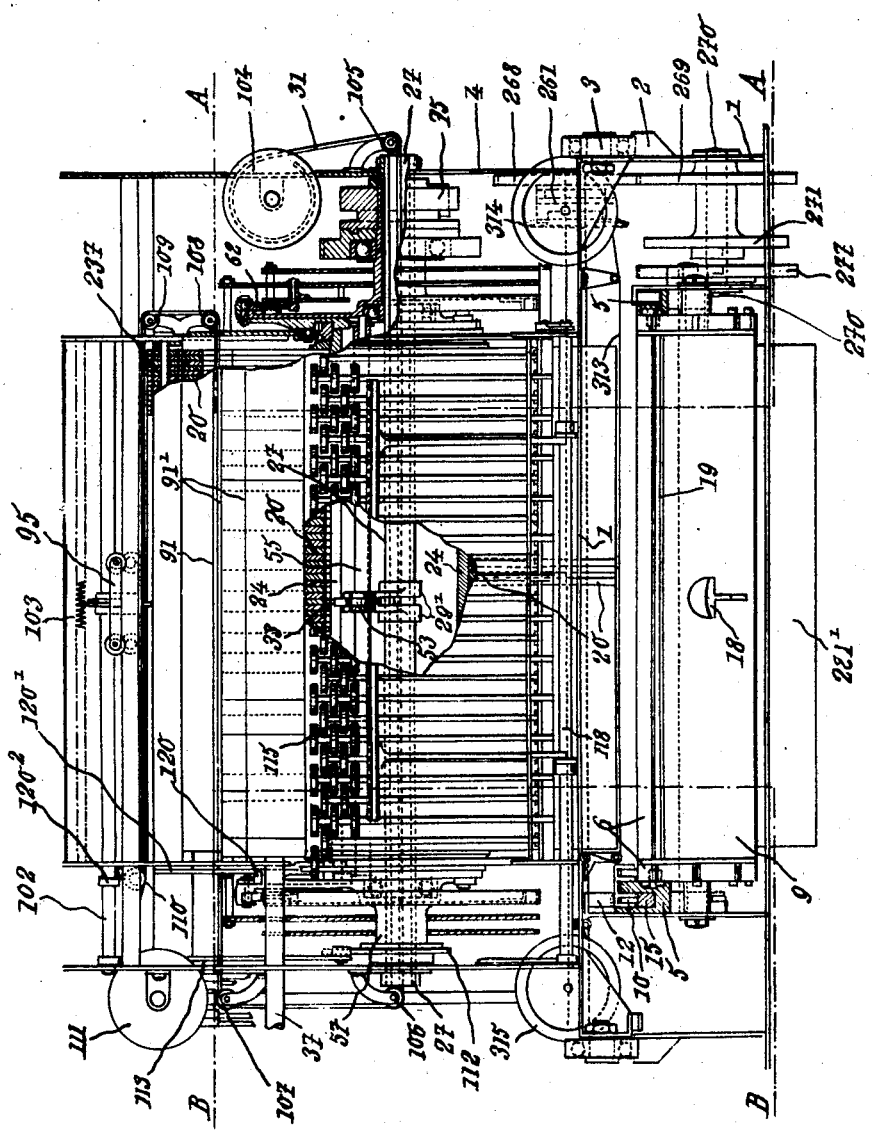
Inventor.
Max Emile Hausheer July 14, 1936.　　　M. E. HAUSHEER　　　2,047,505
ACCOUNTING TYPEWRITER
Filed April 10, 1931　　　13 Sheets-Sheet 2
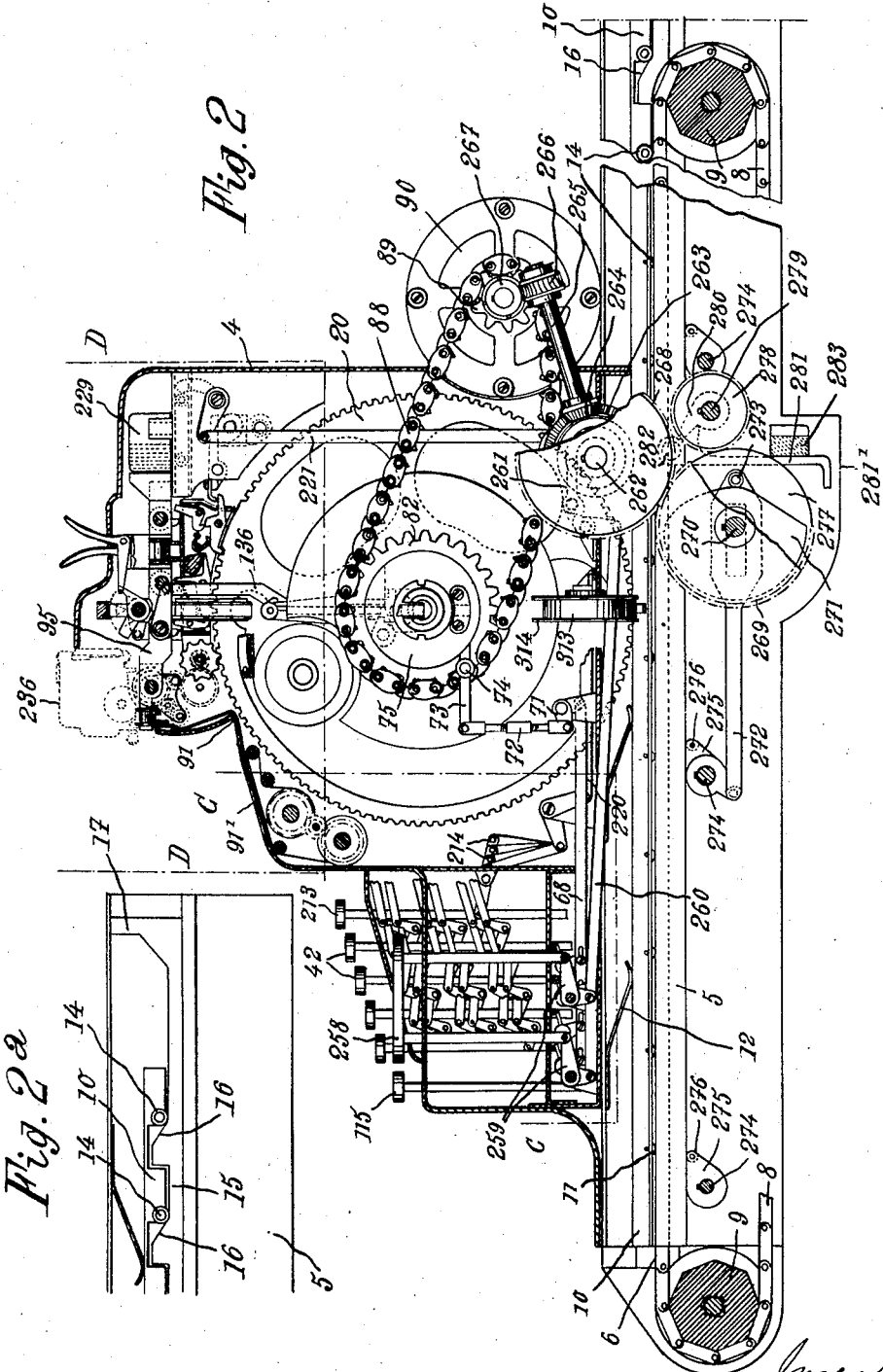
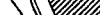

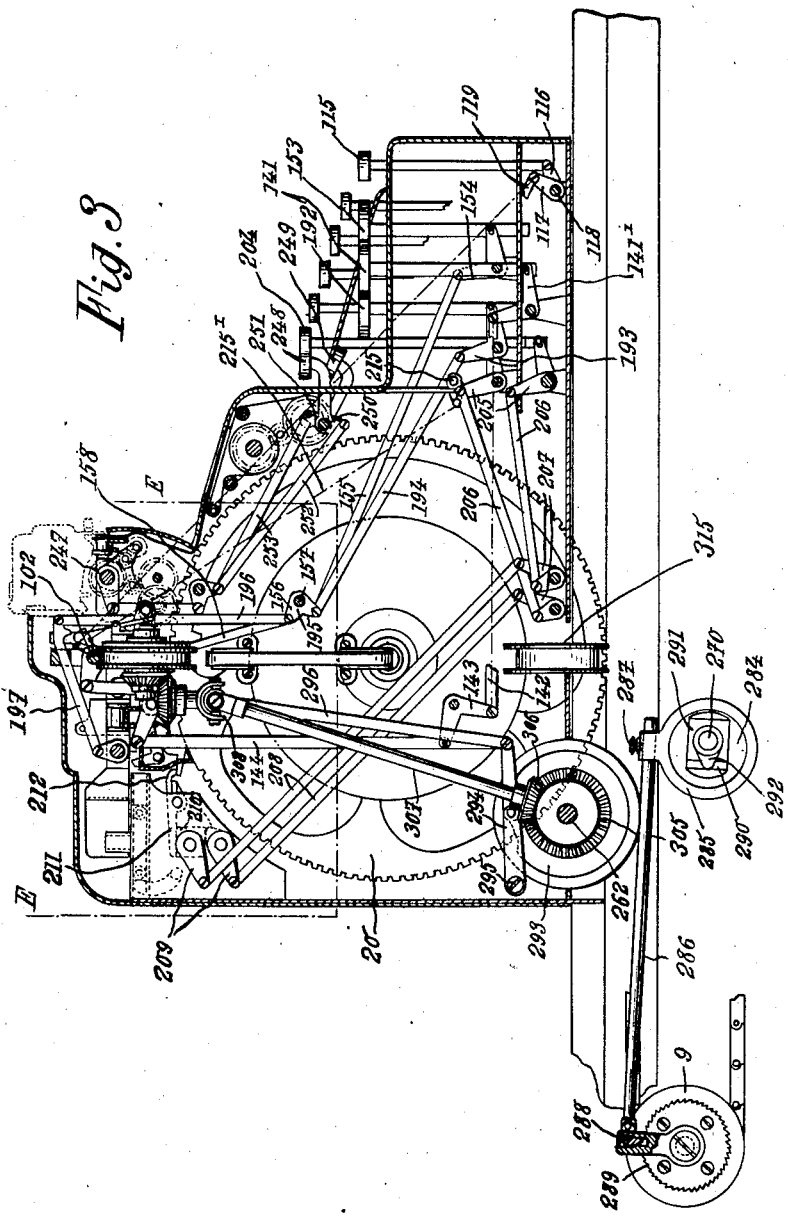

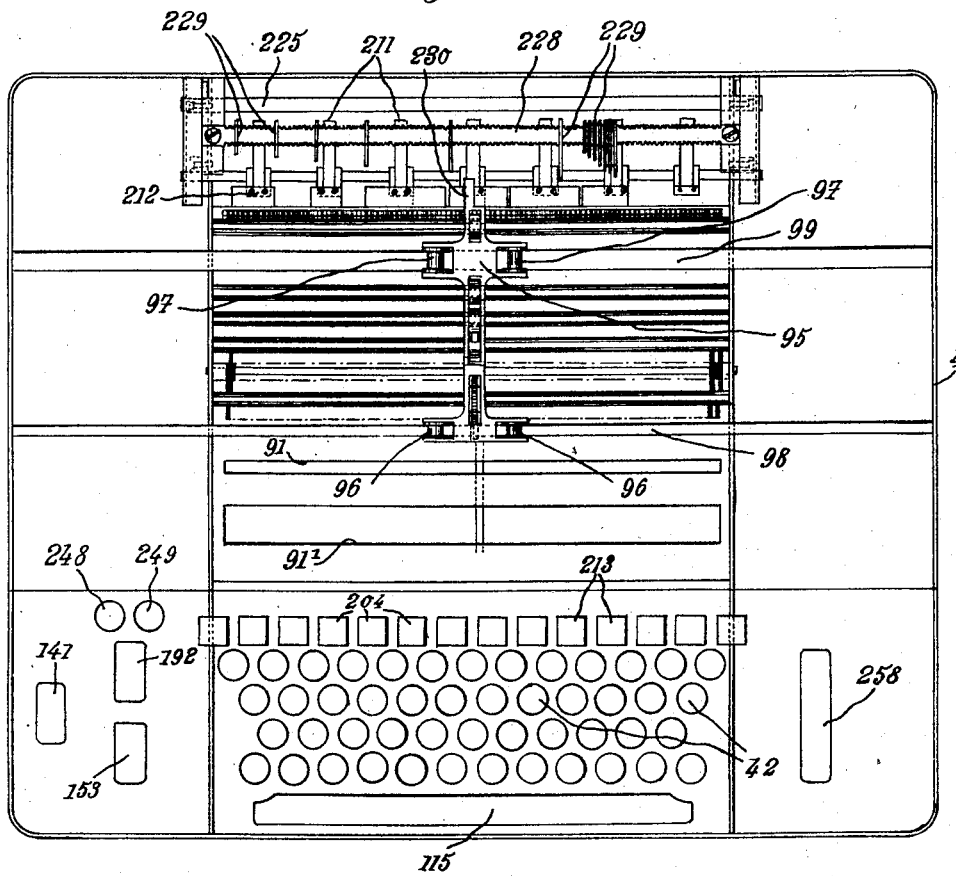

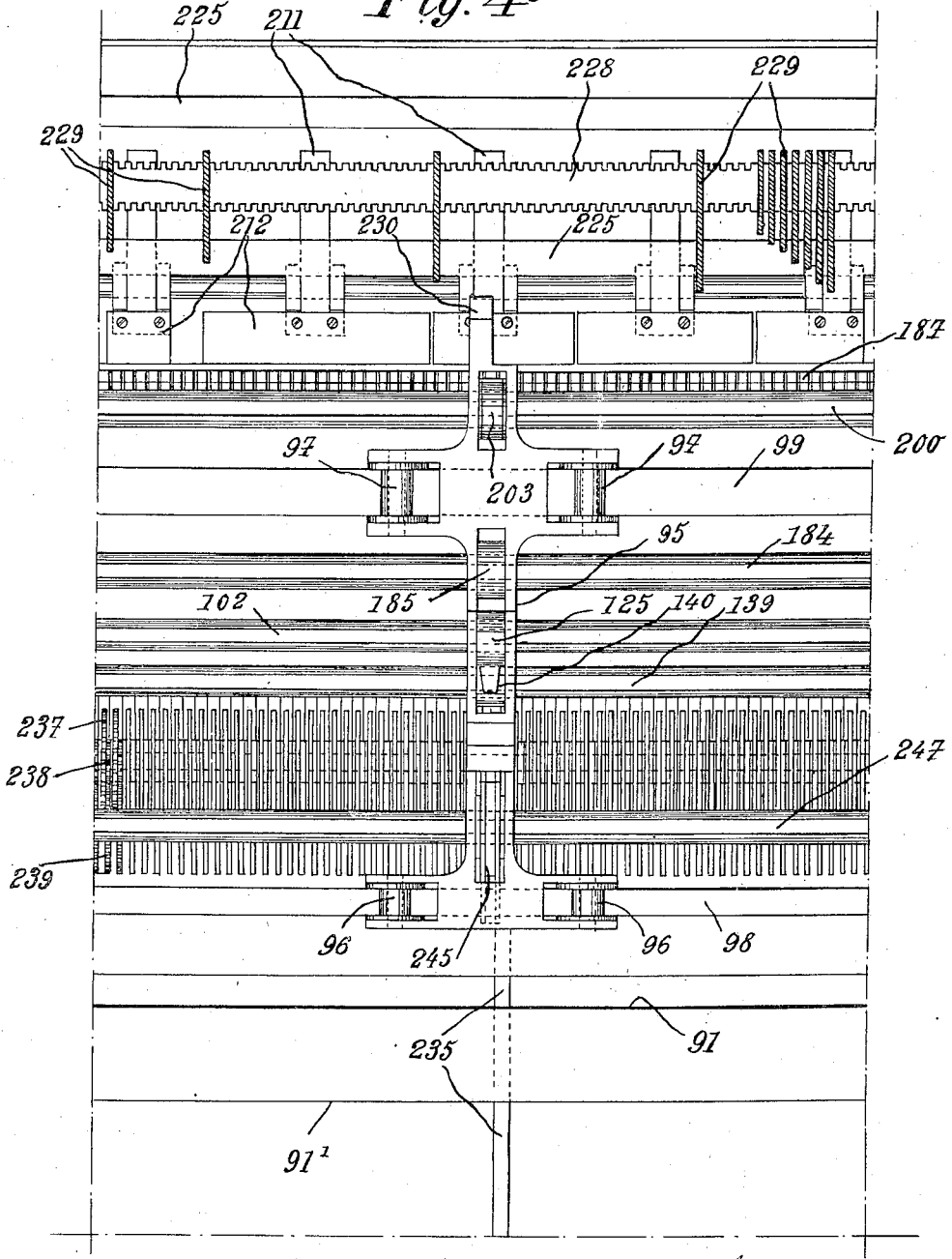

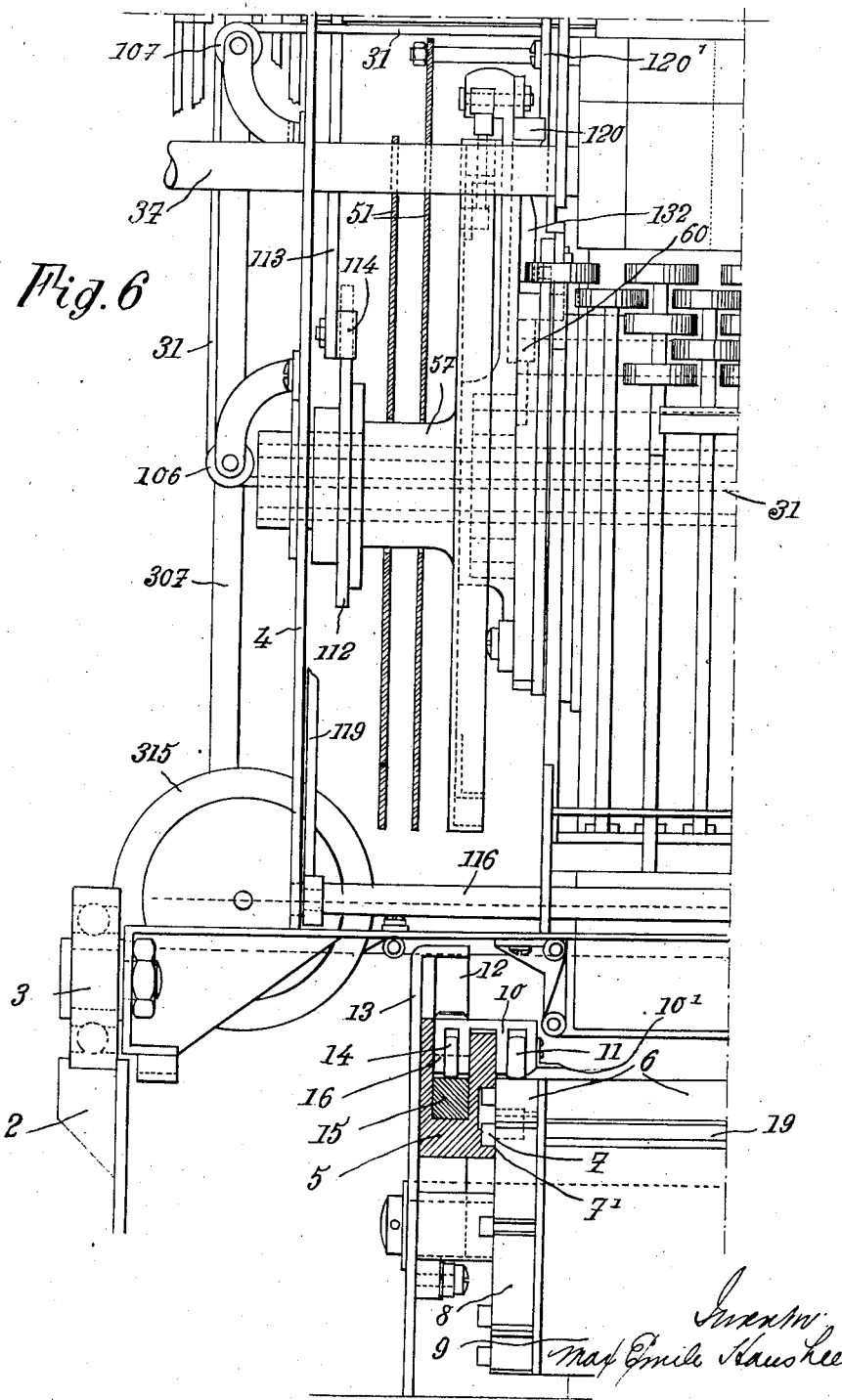

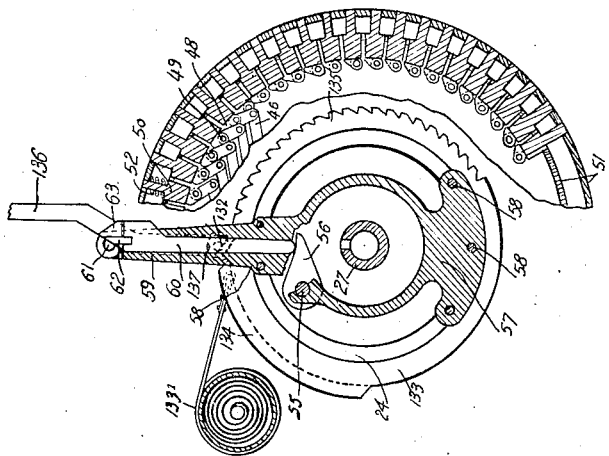

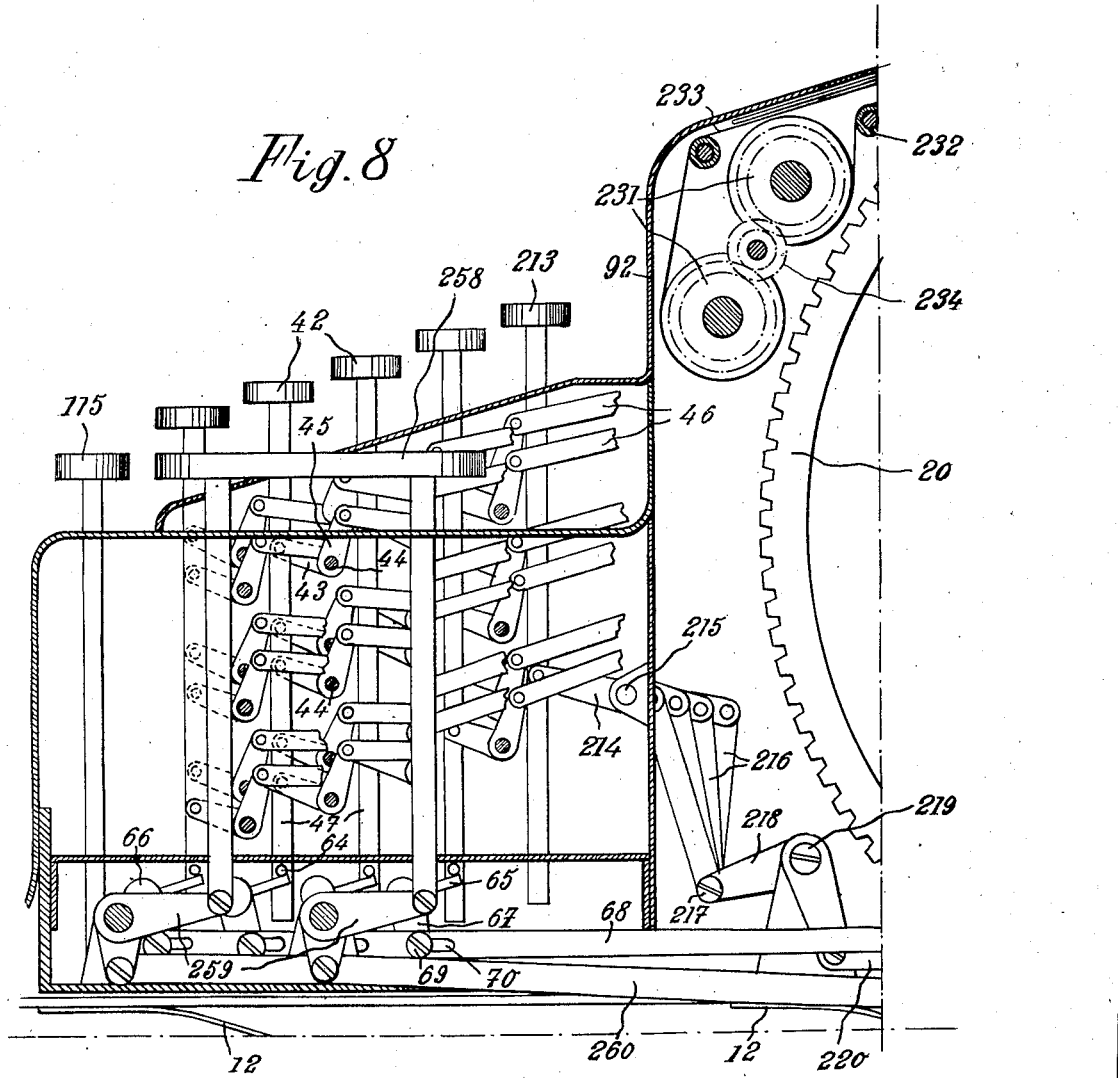

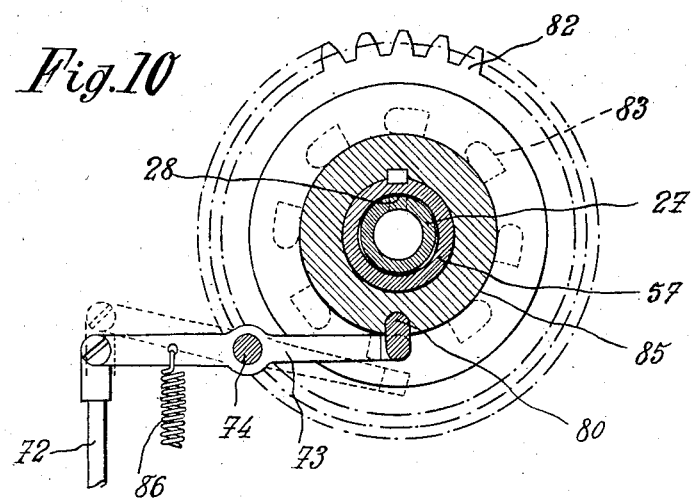
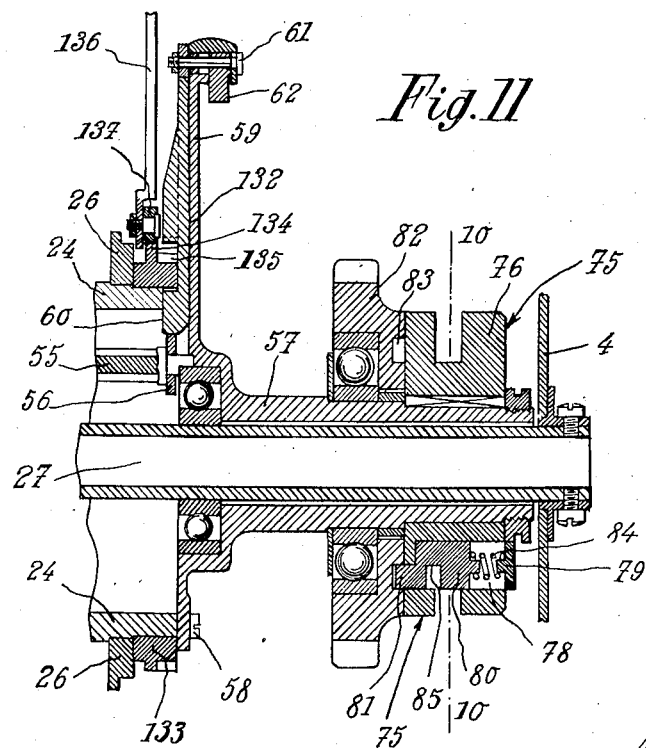

July 14, 1936.  M. E. HAUSHEER  2,047,505
ACCOUNTING TYPEWRITER
Filed April 10, 1931   13 Sheets-Sheet 11
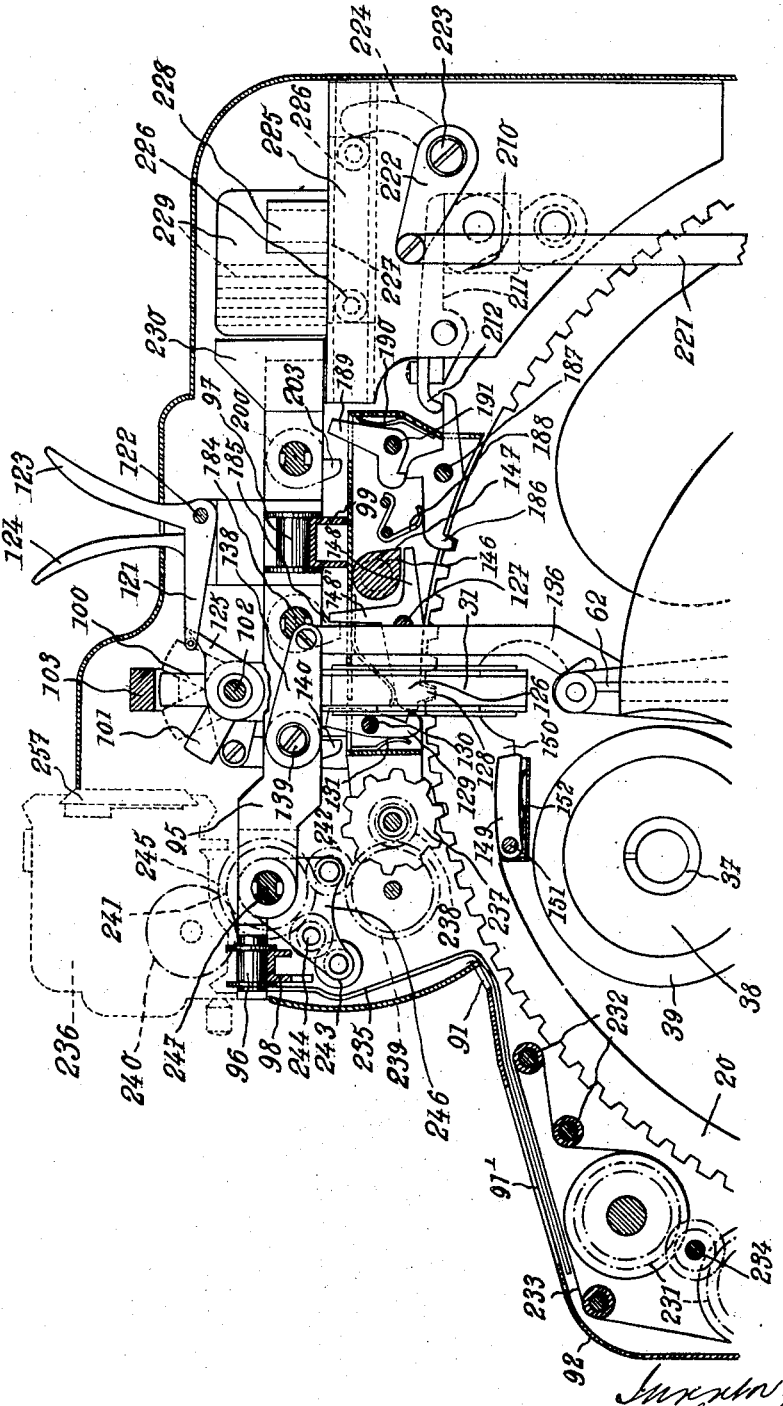

July 14, 1936.  M. E. HAUSHEER  2,047,505
ACCOUNTING TYPEWRITER
Filed April 10, 1931  13 Sheets-Sheet 12
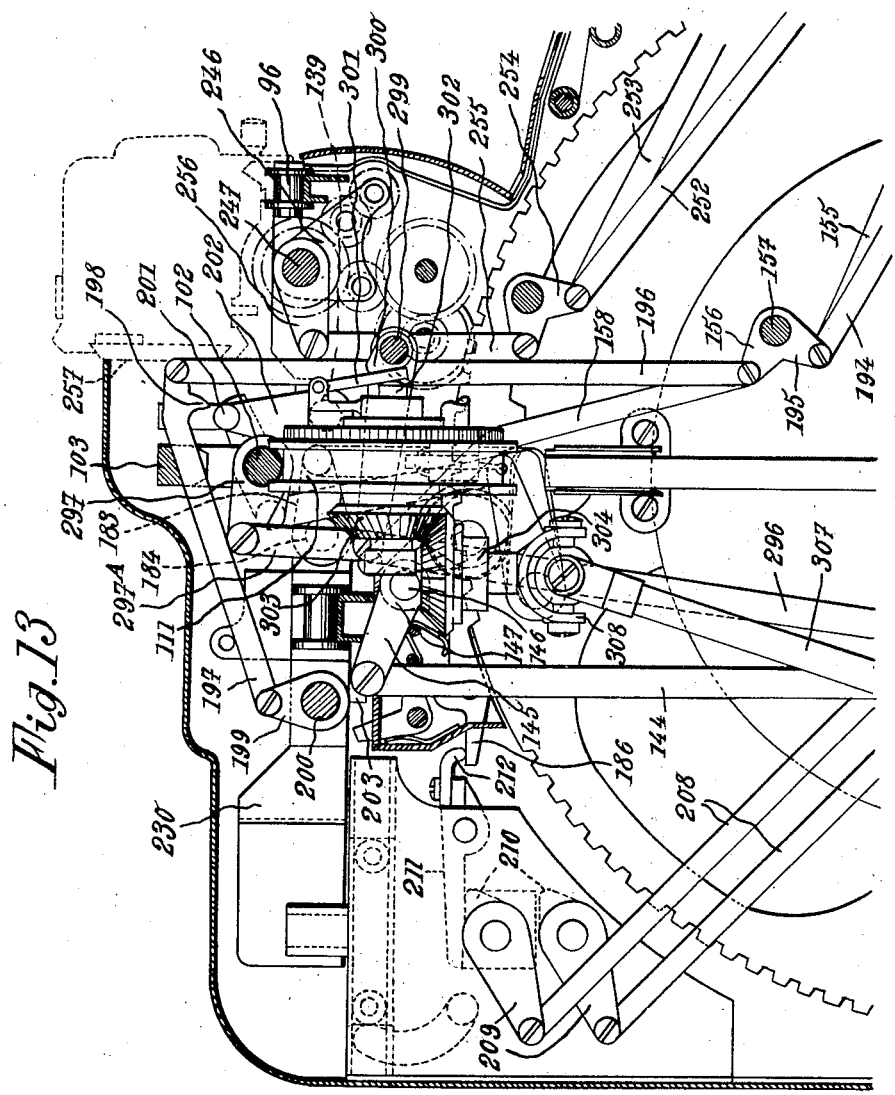

July 14, 1936.  M. E. HAUSHEER  2,047,505
ACCOUNTING TYPEWRITER
Filed April 10, 1931  13 Sheets-Sheet 13
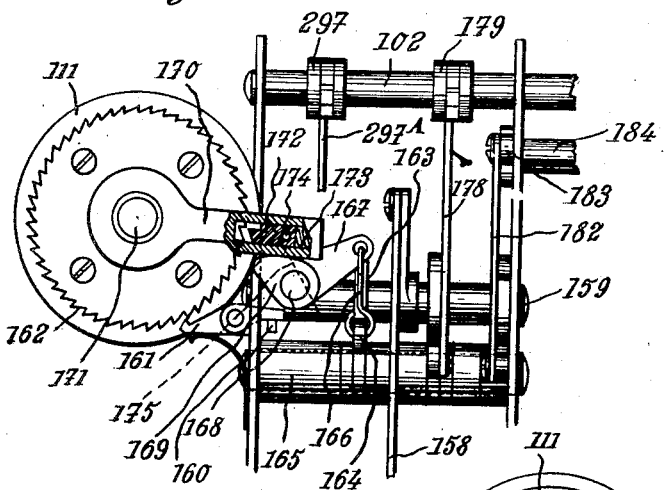
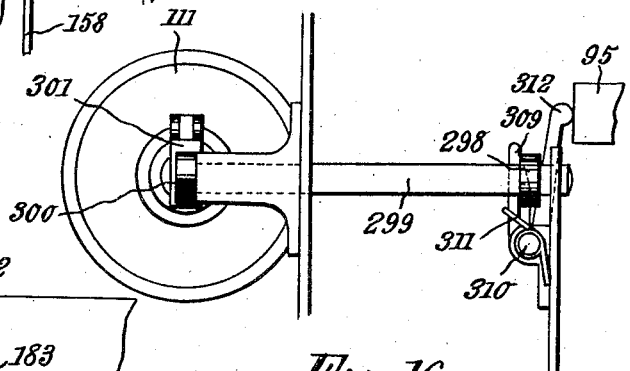
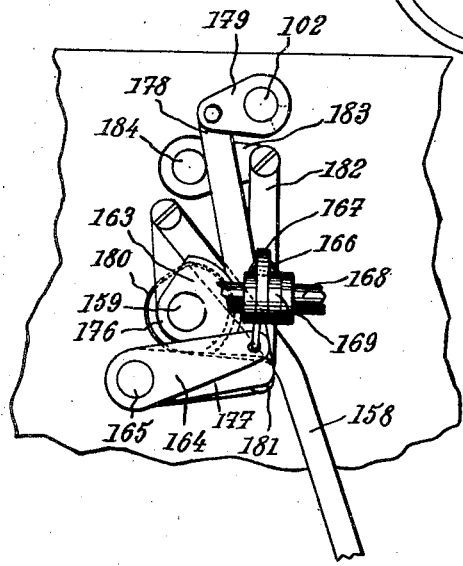
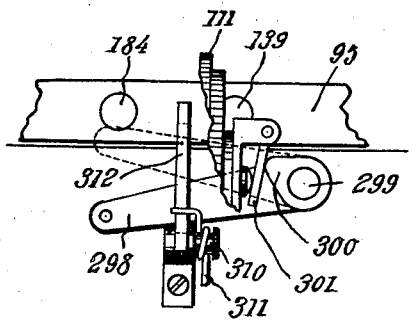

Patented July 14, 1936

2,047,505

UNITED STATES PATENT OFFICE 2,047,505

ACCOUNTING TYPEWRITER

Max Emile Hausheer, Villemomble, France

Application April 10, 1931, Serial No. 529,220
In France April 14, 1930

31 Claims. (Cl. 101—96)

I have filed an application in France on the 14th April 1930, and in Germany on the 4th July 1930.

This invention relates to a typewriting machine.

According to the present invention I provide a machine for typing with previous composition, more particularly of the calculating description, wherein the members which bring about the selection of the letters form a single fixed set mechanically connected with the keys of the keyboard.

The fundamental constructional feature of the machine according to this invention satisfies these conditions by allowing:

1. Writing on a plane surface easily accessible by the rapid displacement of the frame of the machine, and allowing the superposition of several documents of various sizes to be instantaneously interchangeable.

2. Possibility of writing without limitation along the whole length of the line, both letters and figures (added or not) and without that the space required for the characters extending beyond the normal sizes of ordinary typewriters.

3. The verification and correction successively and easily of the line of text composed before printing, and to obtain the successive and immediate visibility of the work of composition with respect to the document on which it is to be written.

4. The keeping visibly composed of any text or portion of text, thus avoiding fresh composition, when the following lines have the same text at the same place in the line.

5. The possibility of utilization along the whole length of the line, of interchangeable totalizers the operation of which is synchronized with the printing members, and whose position is visible and can be corrected before printing.

6. The obtaining of a rapid composition of the line of text by means of a universal keyboard comprising easy moving keys having a straight course and not exercising any mechanical effort even when totalizers are employed.

7. The repetition in the direction of the writing, of a sign, by pressing the corresponding key of the keyboard.

8. The execution of the composition with the minimum of noise.

9. The obtaining of a comfortable working position for the operator, the keyboard remaining in place during the composition, at a normal distance from the operator, and the sides of the machine not being obstructed by the run of a carriage.

10. The concentration of all checking means on the reading line.

11. The maximum of automatic controls, not requiring a special staff.

A constructional form of the invention is illustrated on the accompanying drawings, whereon:—

Fig. 1 is a front elevation of the machine;

Fig. 2 is an elevation of the right hand side of the machine;

Fig. 2a is an elevation of the right hand side of the front extremity of the machine, and constitutes a prolongation of Figure 2;

Fig. 3 is an elevation of the left hand side of the machine;

Fig. 4 is a plan view;

Fig. 4a is a view on a larger scale of the central part of Fig. 4.

Figure 5:
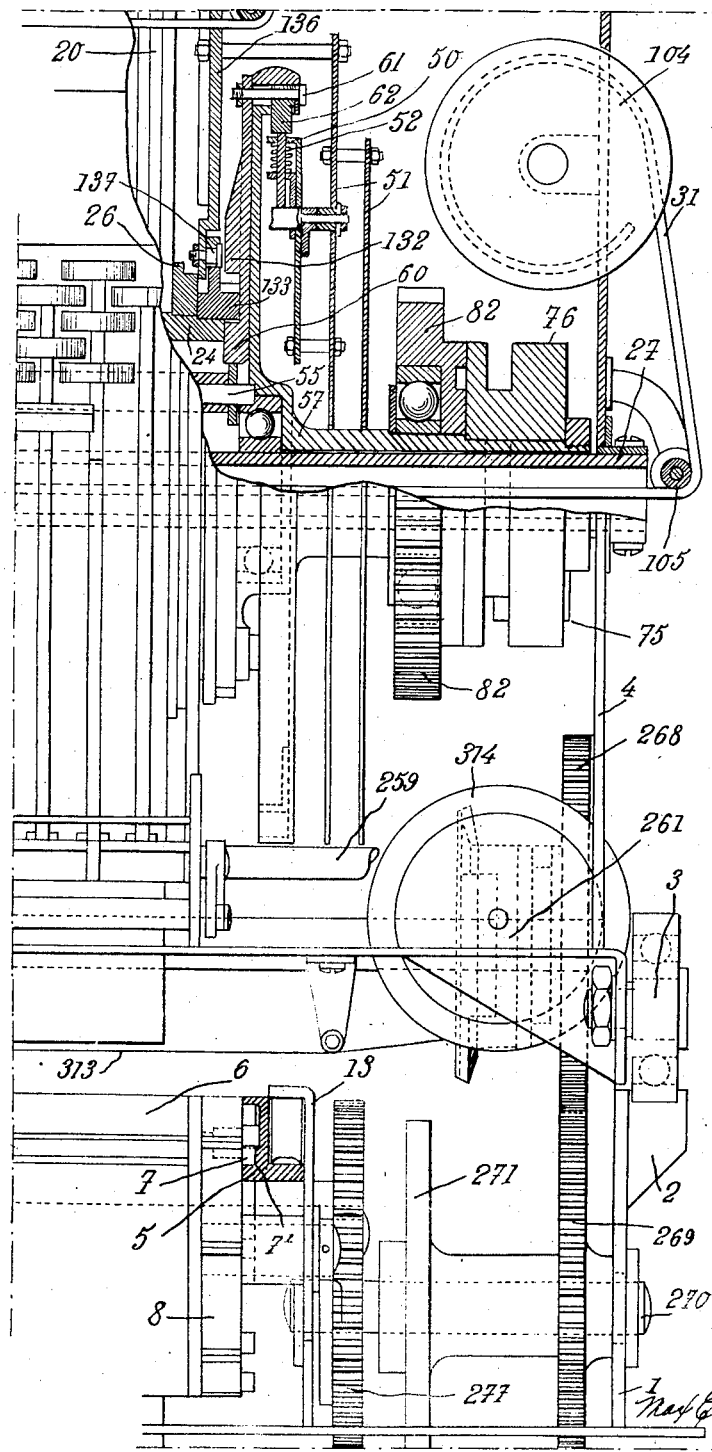

The following figures are detail views to a larger scale.

Fig. 5 is a front elevation of the right hand side of the machine (limited on Fig. 1 by the lines A—A);

Fig. 6 is a front elevation of the left hand side of the machine (limited in Fig. 1 by lines B—B).

Fig. 7 is a side view of a character carrying disc and the connected members;

Fig. 8 is a side view of the keys of the machine (limited on Fig. 2 by the lines C—C).

Fig. 9 is a side view of the selecting mechanism;

Figs. 10 and 11 are side views and axial sections of the selecting clutch;

Fig. 12 is an elevation of the upper part of the machine (limited in Fig. 2 by the lines D—D).

Fig. 13 is an elevation of the left hand side (limited in Fig. 3 by the lines E—E).

Figs. 14 and 15 are side and front views of part of the correction mechanism;

Figs. 16 and 17 are side and front views of the automatic declutching mechanism of the cord drum.

The machine comprises a fixed casing 1 (Fig. 1) which is mounted on a table of tubes adapted to support the whole of the machine. The casing is provided with longitudinal rails 2, supporting the rollers 3 of a movable chassis 4 carrying the key, the impression characters, and intermediate control members. At the interior of the casing 1 a frame 5 (Fig. 5) is arranged and is movable in a vertical plane, the length of the frame being approximately twice the maximum length of the document which can be used in the machine. This frame serves as a guide to the paper support 6 forming a grating, and can be covered with a supple fabric. The paper support is displaced in a longitudinal plane and for this purpose carries rollers 7 rolling in grooves provided in the interior walls of the frame 5. At the front and at the rear, the paper support is provided with two chains 8 (Figs. 1 and 2) fixed at its extremities and passing over drums 9.

On all the length of the left longéron of the frame 5 (Fig. 6) is mounted a roller pincer device 10, the rollers 11 of which are pressed against the upper surface of the paper support 6 by means of a series of springs 12 fixed on the upper part of the longéron 13 of the fixed frame 1. A series of rollers 14 on the pincer device 10 roll on a bar 15 housed in a groove in the frame 5. The bar is provided with a series of ramps 16, some of which are shown in Fig. 2a and which, when the bar is moved back with respect to the frame 5, raises the pincer device and disengages the paper.

The withdrawal of the bar 15 is effected automatically when the movable chassis 4 is withdrawn to the bottom to uncover the paper support completely, owing to a stop 17 carried by the front extremity of the bar 15 (Fig. 2a) and which the chassis displaces at the end of its travel.

A spring pincer device, the control button of which is shown at 18 (Fig. 1) is arranged in the drums 9 and serves to hold the carbons, the rear and front extremities of which engage in the device whilst passing through the slots 19 in the drums.

The displacement withdrawal and advance of the key chassis 4, is effected between two extreme positions. The front position is a fixed position that the chassis occupies during the impression, and the chassis is withdrawn towards its rear position when it is desired to disengage the paper support completely to change the documents to be printed. This movement of the chassis can be controlled either by hand or by means of a pedal. Elastic shock absorbers (not shown) are provided at both extremities of the travel of the chassis and serve simultaneously to deaden the shock of the chassis as it terminates its journey and to give it a certain speed at the start of its movements.

The mechanism for advancing the paper support of the line spacing will be described hereunder.

The impression carriage comprises a series of discs 20 (Fig. 1) whose members are shown in greater detail on Fig. 7. These discs carry on one part of their periphery, a complete set of impression characters (letters or figures) 21 (see Fig. 7), and on another part of the periphery a series of reading or control characters 22. On Fig. 7 the impression characters are distributed between the point A and the point B (see Fig. 7) of the periphery, and the control characters between the points B' and C. The impression and control characters are separated by notches 23 and thus form sets of teeth one of which extends on the periphery of the disc to a point D near the point A. The use of this set of teeth will be explained later.

The discs are mounted loosely on a hollow central cylinder 24 provided with a longitudinal slot 25. The transverse position of the discs on their core is well determined by their thickness and the separating rings 26 mounted at the extremities of the core 24 (the ring 26 mounted on the right extremity of the core is shown in Fig. 5). Each disc corresponds to a given spacing of the line to be printed, and the total number of discs is equal to the number of signs which a line printed with the aid of this machine can comprise. The number of discs determines the length of the machine and its capacity for printing.

The core 24 is traversed from one end to the other by a hollow fixed guiding shaft 27 also provided with a longitudinal slot 28. A cursor 29 is slidable on the shaft 27 and is driven in its longitudinal movement on the shaft by means of a driving member 30 with respect to which it can turn on the shaft 27 and which itself is fixed to a traction cord 31 by means of a key 32. The cursor 29 carries, at its upper part, a movable block or pin 33 capable of sliding vertically in a guide 34 provided in the upper part of the cursor and held, in its striking position, in which its extremity leaves the core through the slot 25 by means of a coil spring 35. The pin has a width (that is, a dimension perpendicular to the plane of Fig. 7) equal to or a little smaller than the thickness of a disc, so that when it is engaged in a notch 36 provided in the nave of each of the discs, it can drive this disc leaving the neighbouring discs free.

The object of the interior cursor 29 and its pin is to bring the discs one after the other in a position so that the desired impression characters come in front of the impression line (at the bottom of Fig. 7). This movement is obtained by a mechanism which is described hereinafter.

The front half of the disc is hollowed out, and a mechanism for restoring the discs to their initial or rest positions is lodged there. This mechanism comprises a shaft 37 parallel to the nave of the discs. In this shaft are fitted the interior ends of as many spiral springs 38 as there are discs. The exterior end of each of these springs is fitted in a toothed barrel 39 and comes into engagement with an interior set of teeth 40 cut at the periphery of the nave 41 of the disc.

The rotation of the discs bringing the desired characters on the impression line, or the selective rotation, is controlled by a series of keys 42 (Fig. 8) each of which corresponds to one of the characters carried by the disc. These keys, which together constitute an ordinary key board arranged at the anterior part of the movable chassis 4, control the levers 43 mounted on the shafts 44. The shafts 44 carry at their ends, levers 45, the latter controlling connecting rods 46. The vertical travel of the rods 47 of the keys is limited, the extremities of these rods abutting on the bottom of the keyboard. The rods 46 each act upon one of the cams 48 (Fig. 9) pivoting on shafts 49. These cams are arranged in an arc of a circle corresponding to the arc A—B of the periphery of the discs, and each actuating one of the angle blocks sliding radially in a ring 51 concentric with the core 24, said blocks being withdrawn towards the interior of the ring by spiral springs 52. The angle blocks 50 are arranged on two sides of the machine, so that one half of the keys 42 control connecting rods 46 passing to the right of the machine and going to the right hand ring 51, whilst the other half is connected to the left hand ring. The successive characters carried by each disc thus correspond alternatively to the blocks 50 of the left and right hand rings. This arrangement permits the reduction by half of the diameter of the rings for given dimensions of the blocks.

The blocks 50 serve to disengage the key 33 of the disc in the notch 36 with which it is engaged when the disc has turned through the composition angle, that is, the angle which brings the desired character on the impression line. To this end, the cursor 29 (Fig. 7) is provided with a cam 53 coming into engagement with a claw 54 of the key 33 and is displaced at the same time as the cursor. The shaft 55 on which this cam is mounted, is a channelled shaft extending through the core 24 and on which the cam 53 slides at the same time as the cursor 29 slides on its shaft 27.

The machine comprises several members controlled in a similar manner, and it may be observed that in general, the control by a channelled shaft is more or less equivalent to a control device which should permit, for example, a smooth shaft and a cam parallel to this shaft and acting on a movable member (such as the cam 53) mounted on this shaft independently of the longitudinal position of the movable member on the shaft, or the cam 53 sliding on the channelled shaft can be replaced by a longitudinal cam acting on the claw 54 of the key, independently of the longitudinal position of the latter. The control by channeled shaft has the advantage that at the moment of control, the channeled shaft sustains no bending effort. This is important for obtaining a control acting with precision.

The shaft 55 carries at each of its ends a lever 56 (Fig. 9). The extremities of the shaft 55 pivot in the end pieces, which will be designated hereafter by "bearings" 57 mounted at the two ends of the core 24 by means of screws 58. The upper part 59 of the bearings 57 serves as a guide for a push member 60 coming into engagement with the lever 56, which is normally withdrawn towards its upper position by the action of the spring 35 of the key. At the upper extremity of the part 59 pivots a shaft 61, on which is fixed a shutter 62 which, at the time of the rotary movement of the core 24, follows the periphery of the ring 51, and a cam 63 engaging with the push member 60. When, during the rotation of the core, the shutter comes into engagement with that one of the blocks 50, which has been raised by the key of the pressed character, it rocks the shutter 62, and the cam 63, which is integral with it and thrusts the push member 60 towards the interior of the core. The push member acts on the lever 56 whose movement is transmitted to the cam 53 (Fig. 7) by the shaft 55. The cam presses on the claw 54 of the key and disengages the latter from the notch 36 of the disc. The driving of a disc thus ceases, when it has turned through the composition angle determined by the raised block, and the character which is brought facing the impression line corresponds to the actuated character key.

The core 24 is driven in the following manner:—

The rods 47 (Fig. 8) of the keys 42 are provided with spurs 64 acting on levers 65 mounted on the shafts 66. The shafts 66 carry levers 67, which act on rods 68 by means of screws 69 engaging in oblong holes 70 provided in the rods 68. This arrangement allows the actuation of the shaft 66 corresponding to the series of keys to which belongs the pressed key, without the movement of the shaft being transmitted to the other keys of the same series, and thus it allows each of the shafts 66 to act on a rod 68 without the movement of the said rod acting on the other shafts 66.

The control rod 68, by the aid of a bent lever 71 (Fig. 2) and a draw member 72 of adjustable length drives a lever 73 pivoting at 74 and causing the operation of a clutch 75. The latter is of the kind which automatically releases the driving after having turned through one turn, and it is represented in detail in Figs. 10 and 11. The clutch comprises a ring 76 fixed at the end of a shaft 27 integral with a bearing 57 and a core 24 and concentric with the latter. In the ring 76 is a transverse guide 78 closed by a plug 79 and in which slides a pawl 80. The extremity 81 of this pawl tends to project on the surface of a crown adjacent to a driving ring 82 and to engage in one of the notches 83 formed in the surface facing the driving ring. The pawl 80 is pushed in this direction by a spring 84 but is maintained in withdrawn position by the chamfered extremity of the lever 73, the extremity being normally held in engagement with a notch 85 in the pawl 80 by means of a spring 86. When one of the keys 42 is pressed, the lever 73 is led into the position shown dotted in Fig. 10, and its extremity is disengaged from the notch 85. The extremity 81 of the pawl 80 leaves the ring 76 and engages in the first notch 83 which it meets, the driving ring 82 being in continuous rotation. The ring 76 is thus driven in this rotation and the shaft 27 completes a turn, after which the notch 85 again meets the end of the lever 73 (returned to its initial position) thus disengaging the extremity 81 of the pawl 80 from the notch 83 and stops the rotation of the shaft 27. The driving ring 82 is driven by a pinion 87 (Fig. 2) connected by a silent chain 88 to the pinion 89 of the motor 90.

As has been described above, the core 24, although it makes an entire turn each time one of the keys 42 is pressed, only drives the disc 20 through an angle determined by the actuated key, an angle from which the key 33 is effaced by the action of the shutter 62 meeting the block 50 actuated by the key and then remains effaced until it faces the notch 36 of the following disc.

At the same time as an impression character is made to face the impression line, the character of the corresponding control is led in front of a longitudinal inspection window 91, provided in the casing 92 of the mechanism carried by the chassis 4 (Fig. 12).

The position of the cursor 29, which is determined by the traction of the cord 31, is rectified by means of a toothed rack 93, (Fig. 7) provided at the interior of the core 24, and provided with a notch facing each disc. The key 33 is provided on the other side with a tooth 94 engaging in the notches of the rack and being disengaged to allow the displacement of the cursor and the passage of the key of a disc to the following disc at the same time as the key is effaced under the action of the cam 53.

The machine comprises locking members for the discs, unlocking members and a system of contralocking called "repetition" whose functioning will be described in detail hereafter. These members come into engagement with the exterior set of teeth 23 of the discs and are divided into three groups. Certain members which will be called "individual members" are mounted in front of each disc, their number being consequently equal to that of the discs. Other members which will be called "general members" are connected to the corresponding control keys and act on the individual members either to control them all at once or by groups, by means of longitudinal cams parallel to the axes of the discs or similar devices, or by the aid of a third kind of member which will be called "common members" and which slide along the discs and come into engagement with the individual member corresponding to the disc before which it finds itself, and which are controlled by the general members by means of longitudinal cams, channeled shafts or similar devices.

The common control members are mounted on a carriage 95 (Figs. 4 and 12) mounted on two pairs of rollers 96 and 97 rolling on rails 98 and 99 integral with the chassis 4.

The carriage 95 is blocked in front of the required discs by means of a lever with two arms 100—101 (Fig. 12) displaceable with the carriage and sliding on a transverse channelled shaft 102. The arms 100 and 101 engage alternately between the teeth of a fixed rack (integral with the chassis) 103 of which each tooth is found in front of a disc. The arms 100 and 101 are unlocked transversely of half the thickness of a disc (half of the pitch of the rack) and can be brought by a rotation of the shaft 102 either into two extreme positions in which the arm 100 or the arm 101 is engaged in the rack or into a mean position leaving the two arms out of engagement.

The carriage 95 is also connected to the traction cord 31. As is shown in Fig. 1 one end of the traction cord 31 is rolled on a spring-pressed drum 104. On leaving this drum, the cord passes on over a pulley 105 and is engaged in the fixed hollow shaft 27. In the interior of this shaft it passes through the driving member 30, to which it is pinned, then leaves through the other end of the shaft 27, passes through the pulleys 106—107 then traverses the right and left hand discs, passes over the pulleys 108 and 109, is fixed under the carriage 95, passes over the pulley 110, and is coiled on a driving drum 111. The operation of this drum will be described hereinafter. The interior cursor 29 is consequently displaced at the same time as the carriage 95 and in the same direction and they are fixed on the cord 31 so as to come in front of the same disc, their position being rectified as has been said, owing to the racks 93 and 103.

At rest, the cursor and the carriage are situated at the left of the machine, in front of the first disc. When the key of the character is pressed at the beginning of the line, the core 24 makes a revolution and drives, during a part of its course, the first disc to carry it into the composing position, after which the engagement is interrupted by the retraction of the key 33. During the second part of its travel the part, which corresponds to the part of the periphery of the discs which do not bear impression characters, a cam 112 (Fig. 6) mounted on the left hand extremity of the core or more exactly on the shaft 27 on the left, lifts a lever 113 carrying a roller 114 (Fig. 6) fixed to a rock arm on the fluted shaft 102 (Fig. 1) and provokes in this way an alternating movement of the lever 100—101. Under the action of the drum spring 104, the cord 31 pulls on the slider and carriage, which is displaced at first half the thickness of a disc when the arm 100 leaves the rack 103 and the arm 101 engages with it, then, during the return movement of the shaft 102, once again through half the thickness of a disc when the arms 100—101 return to the position they started from.

The machine is provided with a spacing mechanism allowing the carriage and slider to be passed from one disc to the following disc without selecting the characters. This mechanism is constituted (see Fig. 3) by a spacing bar 115 which works the escape arrangement described above through a bent lever 116—117 oscillating on the shaft 118. The lever 116 acts on a draw member 119 which acts on a rock lever not shown, supported on the shaft 102. The shaft 102 receives, under the action of the bar 115, an oscillatory movement, and the alternating movement of the arms 100—101 which results, causes displacement of the carriage and of the slider from one disc to the following disc. The key 33 which has not been retracted by the travel of the angle block 50 and the shutter 62 (none of the keys of the characters having been depressed) is disengaged from the notch 36 due to the fact that the pusher 60 of the bearing 57 on the left (see Fig. 6) is provided with a shoulder 120 on which acts a bar which is vertically moved by a lever also fixed on the shaft 102 (these numbers not being shown). When the shaft 102 is actuated, either by the spacing bar 115 or by other means, the bar is lowered and directly lowers the pusher 60 which causes retraction of the key 33 in the manner described.

When it is desired that the carriage and the slider shall be displaceable freely along the length of the discs, the arms 100 and 101 are led to their intermediate position in which they are not in engagement with the rack 103 by means of a lever 121 (see Fig. 12) pivoting on a shaft 122 mounted on the carriage 95 and provided with a handle 123 which is seized at the same time as a fixed handle 124. The approach together of the handles 123 and 124 lowers the lever 121, which acts on a lever 125 sliding on the shaft 102 and thus leads the double lever 100—101 into the intermediate position.

The discs 20, which as has been described, are engaged by the core 24 of the composing angle, and which are then immediately disconnected from the core by the obliteration of a key 33, are at the same moment held in their composing position by means of a locking system. This system comprises (see Fig. 12) as many of angle blocks 126 as there are discs. The angle blocks are rotatably mounted on a common shaft 127 and are each provided with a tooth 128 engaging in the notches 23 of the discs. Normally the blocks 126 are held in their lifted position (allowing free rotation of the discs) due to the stopping latches 129 provided in equal number to the number of the discs, mounted freely on a common shaft 130, coming into engagement with the beaks of the blocks 126 and tending to remain in engagement with the beaks by virtue of the flat spring 131 with which such stopping latch is provided. When the shutter 62 is engaged by the block 50 which corresponds to the key of the actuated character, the pusher 60, as has been seen, is lowered and causes the retraction of the key 33 and the suppression of the operation of the disc 20. The pusher 60 (Fig. 9) is provided with a tooth 132 which co-operates with a ring 133. The ring 133 is mounted freely on the core 24 and is provided with a cam 134 and, on the part of the periphery which corresponds to the arc of the ring 51, which is provided with blocks 50, with teeth 135 each of which is situated opposite one of the blocks 50.

In the normal position (lifted) of the pusher 60, the tooth 132 is situated above the set of teeth 135 and the bearing 57 turns without engaging the ring 133. At the moment when the shutter 62 is actuated by one of the angle blocks 50, the pusher is lowered and the tooth 132 comes into engagement with the first tooth 135 that it encounters. The ring 133 is then carried round and the cam 134 lifts a connecting rod 136 provided with a roller 137 (see Fig. 2), which rod is connected to a lever 138 supported on the fluted shaft 139 (Fig. 12). The fluted shaft 139 extends above the disc 20 and crosses the carriage 95. A lever 140, secured in the carriage, slides on the shaft 139 and when the shaft 139 receives a rotational movement (such as is produced when the cam 134 raises the roller 137) the lever 140 rocks the stopping latch 129 against the action of the spring 131 and thus liberates the block 126 which falls and engages in the notch 23 of that disc 20 with which the members of the slider 29 and the carriage 95 are engaged. This disc, which has just been moved into its composition position by the core 24 is then locked. The discs may be unlocked or released in three ways, that is to say; either before the impression (preimpression release) or all together after the impression (automatic release which, as will be explained later, takes place automatically) and lastly they may be released individually, to correct an error in the position of the respective disc before the impression.

The machine includes a releasing key 141 (see Fig. 4) which, when it is depressed, acts through a bent lever not shown, on a connecting rod 142 (see Fig. 3). The connecting rod 142 causes a bent lever 143 to pivot, the other arm of the lever being connected to a vertical rod 144. The upper extremity of the rod 144 (Fig. 13) is connected to a lever 145 supported on the shaft 146, which carries a cam 147 extending longitudinally above the discs. The cam 147, when rocked, comes into engagement, (Fig. 12) with the tails 148 of the blocks 126 and makes them pivot simultaneously. The discs are thus simultaneously freed and return under the action of the spring barrels 39 to their initial positions, which are determined by the stops 149 coming into engagement with the internal teeth 150 provided on the discs, (see Fig. 7). The stops 149 serve at the same time to deaden the shock which occurs when the disc is stopped. For this purpose they are freely mounted on a common shaft 151 and are forced against the interior surface of the discs by the springs 152. Each interior surface has immediately in front of the tooth 150 a ramp which forces the stop 149 to move back, against the spring 152, thus producing the deadening effect. The carriage and slider may be pulled back by hand to their position of departure by pulling on the handles 123, 124.

The individual correction is controlled by a system which, at the same time as it liberates the disc to be corrected, in order that the latter may return to its initial position, gives a backward movement to the carriage and slider. This backward movement is necessary, because as referred to above, the carriage and slider are automatically moved into engagement with the next successive disc, during the second half of the rotation of the core 24. By actuating the key 153 (Fig. 3) which controls the movement for individual correction, the return of the carriage and sl'der to the disc which has just been brought into the composing position is first caused and this disc is then freed.

The correction key 153 acts on a cranked lever 154, which actuates the rod 155 whose other end is connected to a rocking return lever 156 mounted on a shaft 157 but hidden on Fig. 13 by a similar rocking lever, whose function will be explained later. The rocking lever 156 transmits the movement of the key 154 to a connecting rod 158, which acts on a mechanism represented in detail in Figs. 14 and 15.

The said mechanism comprises a shaft 159 carrying a series of cams and levers. During the first part of the movement of the rod 158, a lever 160, keyed on the shaft 159, is lowered, and allows a pawl 161, on the free end opposite to that at which it acts, to rise and to come into engagement with a ratchet 162 fixed on the driving drum 111 of the cord 31. A cam 163, supported on the shaft 159, then acts on a lever 164 fixed on a shaft 165 which actuates, through a link 166, a lever 167 pivoting on a shaft 168 and integral with a cam 169. The cam 169 then lifts an arm 170 pivoting on the shaft 171 of the drum 111. In the arm slides a pawl 172 urged by a spring 173 to engage with the teeth 162. The pawl 172 is provided with a lateral spur 174 which slides on a fixed inclined plane 175 shown dotted in Fig. 15.

In the normal position of the shaft 159, the pawl 161 is maintained out of engagement with the teeth 162 by the lever 160; the arm 170 is maintained in its lower position (that shown in the drawings) by a spring not shown, and the inclined plane 175 holds the pawl 172 out of contact with the teeth 162. The pawls 161 and 172 cannot therefore hinder the movement of the drum 111 at the time of the normal advancement of the carriage and arm.

When the arm 170 is lifted by the cam 161, the spur 174 slides on the inclined plane 175, and the pawl 172 engages the teeth 162 and, from this moment drives the drum 111. This action causes the winding on the drum of the cord 31 and the withdrawal of the carriage and the slider 29.

At the same time, a cam 176, keyed on the shaft 159, lowers a lever 177 pivoting on the shaft 165 and connected by a rod 178 to a lever 179 supported on the splined shaft 102 actuating the branched lever 100—101. The rotation of the shaft 102 moves the arms 100—101 into their middle position, and disengages them from the rack 103. At the same time, as explained above, the key is released by the play of the bar mentioned and of the pusher 60.

During the operation due to the movement of the rod 158, a cam 180 keyed on the shaft 159, lowers a lever 181 pivoting on the shaft 165, and this lever is connected by a rod 182 to a lever 183 fixed on the splined shaft 184. The splined shaft extends across the discs 20 and controls a cam 185 (Fig. 12) displaced along the shaft as the carriage 95 moves. The cam 185 acts on a third arm of the locking block 126 of the respective disc 20, which has just been brought into the composing position and on to which the carriage 95 has returned during the first part of the movement of the correction key 153. The block 126 is raised and the disc 20 being freed, comes back to its initial position. When the correction key 153 is released, the splined shafts 102 and 184 retake their normal position and the individual members of the disc having just been corrected are found exactly in the position which they occupied before the rotation of the disc which had to be corrected, that is to say, that it is now sufficient to operate the key of the desired character in order that this character may be selected on the disc that has just been released.

If the disc, on to which the carriage and the slider return by the operation of the correction key, is not in the composing position (if, for example, the carriage has left it under the action of the spacing key) a simple backward movement of the carriage and slider without correction evidently takes place.

The backward movements of the carriage and the correction of the disc could also take place in the reverse order. If, for example, the unlocking cam 185 is mounted on the carriage, not in alignment with its other members acting on the individual members of the discs, but was unlocked behind the thickness of a disc, the proportions of various levers etc., of the movements of the individual correction could be regulated so as to actuate first the shaft 184 and then the drum 111. The cam 185 being unlocked to the rear and the carriage being brought to the end of the composition movement in front of the following disc, the cam 185 engages with the blocking block 126 of the disc which has just been composed and which the carriage has just left. The rotation of the shaft 184 can take place, for example, at the same time as the first part of the movement of the shaft 168 that is to say, that which brings the pawl 172 into engagement with the ratchet 162 without the latter being driven again.

The machine comprises in addition a contralocking or repetition system, the aim of which is to allow the repetition of the signs, of words or desired parts of a line desired on an undetermined line number, without the necessity of troubling the composition each time. This system is particularly advantageous in writings comprising certain columns whose contents are the same for a certain number of lines; for example, the date column or "counting" column of account writings. These repetitions can naturally be eliminated at the desired moment.

This system comprises a series of individual blocking blocks 186 (Fig. 12) freely mounted on a common shaft 187 and coming into engagement with the set of teeth 23 of the discs under the action of springs 188. The blocks 186 are normally held in their raised positions by individual stop latches 189, which springs 190 tend to hold in their lowered positions (in which they are in engagement with the blocks 187). When the stopping latches 189 pivoted on the shaft 191 are rocked against the action of the springs, the blocks 186 are freed and come into engagement with the teeth 23 (position shown in drawings). The lifting of a blocking block 126 does not involve the liberation of the locked disc by the repetition block 186, and the disc remains in its composed position indefinitely until the cancellation of the repetition, which is effected by a mechanism which will be described hereinafter.

The repetition is set (that is to say, the block 186 of the disc of which repetition is desired is freed) by means of a repetition key 192 (see Fig. 3). This key acts through the intermediary of a bent lever 193, a rod 194, a bell crank 195 mounted on the shaft 157 and a link 196 operating a rod 197 (Fig. 13) provided with a hook 197'. The said rod 197, which is articulated to a lever 198 keyed on a splined shaft 200, is then lowered and its hook 197' comes into engagement with a spur 201 carried by a lever 202 keyed on the splined shaft 139. When the shaft 139 (Fig. 12) is actuated by the rod 136 (a movement which is produced when the disc arrives in its composition position, and which causes the locking of the disc in this position by means of the block 128) its movement is transmitted by the hook 197' and the lever 199 to the splined shaft 200, which extends across all the discs and on which the carriage traverses. The carriage carries a cam 203 which slides with it during movement and which slides on the splined shaft 200. When the shaft 200 turns, the cam 203 pivots the stopping latch 189, which disengages the blocking block 186 this causing the locking of the disc by the block and effects the setting of the disc for repetition.

In order to cancel the repetitions, there can be provided individual members controlled by a common member displaceable with the carriage in the same manner as is carried out, for example, by the individual raising of the blocking blocks 126 in view of the individual correction. In the machine shown on the drawings, this kind of control has not been provided. There has been shown on the other hand a repetition cancellation system which is controlled by several keys 204 (see Figs. 3 and 4) each of which acts on a group of discs.

The keys 204 transmit their movements by the aid of cranked levers 205, connecting-rods 206, cranked levers 207, and connecting-rods 208, to levers 209 driving graduated cams 210 (Fig. 12) which rock levers 211 on which are mounted interchangeable plates 212 (Fig. 12) arranged to rock the blocking blocks 186 rearwardly. The rocked blocks 186 are engaged by their respective stop latches 189 and stay in their raised position, in which they do not act on the discs. The key 204 connected to the lever 211 can be caused to actuate a desired number of blocking blocks 186 by mounting on levers 211 corresponding to desired block 186, plates 212 of convenient length. This arrangement allows, for example of making each cancellation repetition key correspond to a column of the document, however wide this column may be.

The machine is provided with a system of tabulation stops allowing the carriage and the slider to be driven for cooperation with the disc corresponding to a desired place on the printed line. This system of tabulation moreover permits the carriage to be positioned in certain columns (columns of figures) to the desired decimal. A certain number of tabulation keys 213 (Fig. 2) act on graduated levers 214 mounted movably on a common movable shaft 215 and connected by link 216 to a shaft 217. The shaft 217 acts by the aid of two cranked levers 218 pivoting at the extremities of a fixed shaft 219 on two draw-bars 220. The draw bars 220 drive, by means of cranked levers not shown, vertical connecting rods 221 (Fig. 2) which act on levers 222, keyed at the ends of a shaft 223 (Fig. 12). The vertical travel of the keys 213 being limited in the same way as those of the keys 42, and being the same for all the keys 213, the movement communicated to the levers 222 is in accordance with the arm ratios of the levers 214.

Levers 224 keyed on the shaft 223 act on a tabulation carriage 225, which extends across the whole width of the machine (see Fig. 4) and can receive a longitudinal movement. The carriage is mounted to this end on rollers 226 (Fig. 12) rolling in guides 227 integral with the carriage 6. The tabulation carriage, which is withdrawn towards its rear position, by a spring (not shown) advances under the action of levers 224 to a distance which corresponds to the tabulation key pressed down. The carriage carries a rack 228 on which can be placed graduated travelling abutments 229 (see Fig. 4). The abutments 229 can be disposed on the rack 228 in any way desired at variable distances from one another and in desired number, provided that the number does not exceed that of the tabulation keys.

When the carriage 225 advances under the action of a tabulating key, the abutment 229 corresponding to this key acts as a stopping abutment on the composition carriage 75, which is provided, to this end with an ear 230.

The common shaft 215 of the graduated levers 214 turns through the same angle whichever tabulation key 213 is pressed, if the vertical travel of all these keys is the same and the parts of the levers 214 actuated by the keys are equal. The shaft 215 carries, at its two ends, levers (not shown) driven by the aid of connecting rods, cranked levers or other analogous elements (not shown) on the splined shaft 102, and moving the double lever 100—101 to its central position. The carriage 95, which is now free, advances when under the action of the cord 31, until its ear 230 comes against the abutment 229 corresponding to the key pressed.

An abutment of a given length, or a row of abutments should necessarily correspond to a tabulation key, but the series of abutments corresponding to the series of tabulation keys can be repeated many times on the rack 228. It is necessary then, in order to bring the composition carriage to an abutment of the second series, for example, to exceed at first the first series; that is to say, only to press the key corresponding to the desired row of abutments, when the carriage has already been brought to the second series of abutments in which the abutment in front stops the carriage.

In Fig. 4, is shown two series of abutments, of which one corresponds to the ordinary tabulation; that is to say, to the tabulation of columns, and of which the other corresponds to the decimal tabulation in the limits of the penultimate column. The abutments 229 of the second series, are mounted one after the other, in such a way as to correspond to successive places of the corresponding fraction of the printed line. In order to make use of the abutments of the decimal tabulation, it is necessary to let the composition carriage pass beyond the last abutment of the first series (by pressing on the corresponding tabulation key) and thereafter only pressing the tabulation key corresponding to the row of abutments desired. The term "row of abutments" refers to the abutments of the same length of a different series, these abutments corresponding to a like tabulation key.

The machine is provided with a system of indication and of control which, in addition to the ability that it gives of seeing a reproduction of the line before being printed as soon as it is composed (owing to the control characters 22 and to the observation window 91) allows at the same time the composition to be compared with a model text, or of seeing a reproduction of the headings of the columns of the document (which is hidden by the carriage 4). To this end, the machine is provided with an arrangement of cylinders 231 and of return cylinders 232 (see Fig. 12) supporting a strip of paper 233 on which is printed the matter to be reproduced (such as for example addresses of clients) headings of columns and other useful matter. A button 234 permits the actuation of the cylinders 231, and the bringing of the desired line carried by the strip of paper 233 in front of an inspection window 91' disposed in the case 82.

The carriage 95 carries a pointer 235 which moves the length of the window 91 and of the inspection window 91' and indicates on the line the character which ought to appear at the corresponding place of the line to be printed, which corresponds to the disc with which the elements of the carriage and of the interior slider are engaged, or the heading of the column to which the word in composition refers.

The machine is provided with a series of totalizers 236 adapted to be mounted in front of discs as desired (Fig. 12). The totalizers are mounted on the carriage and so remain immovable. They are driven by the teeth 23 of the disc by the aid of fixedly journalled pinions 237, 238 and 239, of a pinion 240, forming part of each totalizer, and of a set of return pinions mounted on the carriage 95 and inserted between the pinion 239 of the disc in the course of composition and the pinion 240 of its totalizer. The set of return pinions comprises a pinion 241 engaging with the pinion 240 and driven by the pinion 239 by the aid, either of a pinion 242, or of pinions 243, 244 and 245. The return pinions are mounted in a rocking inner nave moving with the carriage and running on a splined shaft 247. By oscillating the shaft 247, there is transmitted to the pinion 240 of the totalizer the movement of the pinion 239, either in one direction or in the other which permits of addition or subtraction being carried out. The movement of the shaft 247 is obtained by two keys 248 and 249 (see Fig. 3) through the aid of levers 250 and 251, connecting rods 252 and 253, a bell crank 254 (Fig. 13) a vertical link 255 and a lever keyed on the shaft 247.

The totalizers are mounted on a slide 257 and can be fixed thereon in front of the desired discs and in desired number.

A line having been composed, the impression is made by pressing on a key 258 (Fig. 8). The impression comprises a series of known movements, the lifting of the paper support 6, the impression, the lowering of the paper supports, its advance (space between the lines) the stopping of the composition (except repetitions) and the return of the sliders, to the starting position.

The key 258 operates, by the aid of cranked levers 259, a horizontal rod 260 which engages clutch 261 acting on the clutch. The shaft 262 of the part driven by the clutch 261 (mounted on the carriage 4) is then rotated by the motor 90 through a transmission comprising bevel pinions 263 and 264, the shaft 265 and helicoidal pinions 266 and 267. The movement of the shaft 262 is transmitted, by the pinions 268 and 269, to a shaft 270 mounted on the structure 1 and driving a cam 271. The cam 271 actuates a connecting rod 272 provided with a guide slot sliding on the shaft 270 and carrying a roller 273 in engagement with the cam 271. The connecting rod 272 drives a series of camshafts 274 connected to each other; by means of connecting-rods, not shown, the cams 275, keyed on the said shafts, operate (through rollers 276) on the frame 5, in which the paper support 6 is slidable. The paper support is thus raised, and the documents come into contact with the composed discs.

A pinion 277 keyed on the shaft 270 drives a pinion 278 keyed on a transverse shaft 279, also mounted on the fixed frame of the machine. Cams 280 keyed on the shaft 279 push against the upper ends of the hammers 281 freely oscillating on a common shaft 282. The hammers strike the documents below on a line registering with the composed line of the discs 20, with the interposition of a supple screen, not shown. Released by the cams 280, the hammers fall again freely on rubber abutments 283.

In order to distribute the work necessary for the striking of the hammers 281 on one or more turns of the shaft 279 (the pinions 277 and 278 causing the shaft 279 to make several revolutions when the shaft 262 only makes one) the cams 280 can be mounted on the shaft 279, in such a way as to act on their hammers one after the other and to form, in some way, a helicoidal sectional cam, each section of which is set parallel to the shaft 279.

When the cam 271 returns to its initial position, the frame 5 is again lowered both by the action of its weight and by that of the spring 12. The advance of the paper support is obtained through an eccentric 284 (Fig. 3) mounted on the shaft 270 on the opposite side of the machine to the pinion 269. The rear drum 9 of the paper support is actuated by the strap 265 of the eccentric by a connecting-rod 286, of regulatable position (fixed in the strap 285 by means of a set screw 287) and of a pawl 288 and ratched wheel 289, similar to the pawl 170—172 and to the ratchet 162 of the drum 111 of the cord represented on Fig. 15.

The eccentric 284 is mounted on the shaft 270 by means of an arrangement allowing of the variation of its travel. To this end, it comprises a guiding slot 290, in which runs a slide 291, keyed on the shaft 270. The position of the slide with respect to the eccentric, which determines the travel of the latter, can be changed by reversing a cam 292 coming into engagement with one or the other of the extreme walls of the window 290, and frictionally mounted on the shaft 270, this cam being adapted to be rotated on the shaft by hand, by means of an appropriate knob.

The return of the carriage 95 and of the slide 29 is controlled by the following mechanism.

The shaft 262 carries, at its end opposite to the clutch 261, two cams 293 of which one only is shown on Fig. 3. One of the cams acts on a lever 294 pivoting on a fixed shaft 295 and operating a draw bar 296 connected to a lever 297 (Fig. 13) keyed on the splined shaft 102 and also actuating a lever 298 (Fig. 16) mounted on a shaft 299.

The displacement of the lever 297 puts the two armed lever 100—101 in its central position (disengaged from the rack 103) (Fig. 13), and the movement of the lever 298 displaces a cam 300 keyed on the shaft 299 and which acts on an oscillating plate 301. The plate 301 longitudinally displaces the shaft 302 of the drum 111 and by this movement causes the engagement of the drum with a bevel pinion 303 engaging with a bevel pinion 304 driven by the shaft 262 (Fig. 3) by the aid of bevel pinions 305 and 306 of the shaft 307 and of a universal joint 308.

The rotation through a revolution of the shaft 262 causes the return of the carriage or of the slider starting from their extreme position (in front of the last disc). On the other hand, the carriage can, at the moment of the impression, be in any position whatever on the line, the latter not always being filled up to the edge. The machine comprises, therefore, an automatic declutching arrangement, stopping the driving of the drum 111, when the carriage returns to its initial position, independently of the angle through which the shaft 262 has turned at this time.

This arrangement is shown in greater detail on Figures 16 and 17. The lever 298, which the rod 296 lowers in order to cause the clutching on the drum 111, is maintained in this position by a pawl 309, oscillating on a shaft 310 and maintained in engagement with the lever 298 by a spring 311. The pawl is provided with a lever 312. When the carriage 95 returns to its initial position, its extremity abuts against the lever 312, displaces the pawl 309 and frees the lever 298, the latter returning to its normal position shown in dotted lines in Fig. 16 and stops the driving of the drum 111. The cam 293 releases the lever 294 when the lever 298 is engaged by the pawl 309, and the draw bar 296 is maintained in its lowered position by such engagement.

The second cam 293 lowers a lever (hidden in Fig. 3 by the lever 294) which lowers the connecting rod 144, the latter, as described in connection with the working of the correction key, operating a longitudinal cam 147 which raises the blocking blocks 126. Those of the discs on which the repetition has not been imposed, are then liberated and return to their rest position under the action of the spring barrels 39.

The machine comprises, as usual, an inking ribbon 313 (Fig. 2) moving in a horizontal direction with respect to the machine between the aligned impression characters and the document. The ribbon is wound at its extremities on drums 314 and 315 (Fig. 1) driven by means of some known ratchet mechanism.

In pressing on the impression key 258, there is thus obtained, in addition to the impression of the composed line, the complete preparation of the machine for the composition and for the impression of the following line. That is directly proceeded with if the manuscript does not necessitate the exchange of documents for the next impression. In the contrary case, the carriage 4 is drawn back whereby as mentioned above, the paper support is uncovered and the paper nippers raised. The exchange of the documents can thus be effected easily, after which the carriage is pulled into its impression position, thus rendering the machine ready to function again.

To write on loose sheets and obtain duplicates they must first be put into position. This operation is made as follows:

First, the machine is pushed back as far as possible, it then presses against the stop piece 17 of the bar 15 which is driven backwards. During this movement of the bar 15, its ramps 16 act on the rollers 14 and the pressure bar 10 is raised. The machine being in the position as far back as possible, the pliant paper support 6 is uncovered. The carbon papers are placed above and stretched by the nippers 19 fixed on the winding drums 9. The sheets for the writing are laid on the support 6, the duplicates between the carbons and the original above the carbons under the pressure bar 10, in such a way that the left hand border rests on the interior side of the frame 5 and the place to be written upon opposite a fixed arrow guide mark.

The documents being in place, the machine must be put into position for work. For this, it suffices to bring it as far as possible forward by means of the device provided for the purpose; by hand, with a pedal or by means of a motor. Thus the line to be written will be under a line of printed letters. This line would be reproduced on the sheets and carbon papers simply by working the hammers 281 by means of the printing key 258 which would strike against the pliant support 6.

Before working the key 258, the line of type to be reproduced on the sheet must be composed, and to do this it suffices to press the proper keys 42 of the keyboard.

By pressing a key 42 five movements are produced in the following order;
1. Selection of the type.
2. Gearing of the disc driving mechanism situated opposite the place of the type to be reproduced in the line of writing.
3. Locking the disc.
4. Release of the carriage and slide.
5. Automatic ungearing.

I. Selection of the type

By pressing a key 42 the lever 43 through the aid of the transversal shaft 44 of the lever 45, of the connecting rod 46 and of the lever 48, makes the corresponding selection pin 50 leave its seat to subsequently act as a stop.

II. Gearing of the disc driving mechanism

At the same instant, the rod 47 of the key 42 works the corresponding lever 66 and the pull 68. The latter, by means of the members 71, 72, 73 causes engagement of the bearing 57 situated on the right of the machine, with a driving pulley 87 in continuous motion. The engagement takes place as follows. The lever 73, worked by the aforesaid members, escapes from the conical notch 85 of the catch 80, the latter being thus released, is pushed by the spring 84 to the front, the extremity 81 entering the notches 83 of the driving pulley. When the bearing on the right 57 rotates, it drives the cylinder 24, the bearing on the left and the slide 29. The latter is fitted loosely on the main shaft 27 and is driven transversely by means of a sliding part 30 placed between the slides 29' of the slides and to which the pull string 31 is fixed.

The slide 29, and also the cam 53, the grooved shaft 55 of which is connected at both ends with the bearings 57, is driven by the latch 33 which is driven by the circular motion of the cylinder 24, because the catch 33 is lodged and guided in the transversal slot 25. This circular motion of the latch 33 drives, by the notch 36, the disc 20 until the shutter 62 of one of the two bearings 57 comes into contact with the selection stop-piece 50 which has left its seat, when the selected key 42 is pressed. At this moment, the cam 63 of the shutter 62 pushes the rod 60 which is lodged in the arm 59 of the bearing 57. Thus pushed, the rod 60 works the lever 56 and the said lever makes the grooved rod 55 turn and transmit its motion to the sliding cam 53, which presses on the boss of the spring latch 33 until the latter has left the notch of the disc 20. At this moment, the selected type is in printing position and to be locked in such position. The latch 33 which presses on the inner side of the disc 20, is withdrawn and the rotation of the disc ceases.

III. Locking the disc

At the instant when the arm 62 of the bearing 57 impinges on the selection stop 50, moved out of its seat by the pressure exerted on the key 42, the arm 62 swings, and the end of the push piece 132 comes to rest in the tooth 135 of the ring 133 corresponding to the selection stop 50 which has left its seat. The ring 133 carries a cam 134. When the tooth 132 of the push piece 60 engages in the tooth 135, the cam 134 of the ring 133 thus driven by the bearing 57, pushes the roller 137 placed at the foot of a rod 136. This rod 136 is raised and pushes the lever 138, and this lever makes the grooved shaft 139 turn, which operates the cam 140 fitted on the shaft 139 by smooth friction and driven by the two sides 95' of the carriage 95 opposite the disc one of the type of which must be brought into the position for printing. The cam 140 then acts against an arm of one of the little stop latches, 129 opposite the same disc. The stop latch 129 releases the corresponding locking catch 126, which then enters the toothing of the same disc 20.

At this moment, the required disc, driven into the proper position, is locked and is in position to reproduce the selected type.

In this position, the type selected is positioned in one set of type for direct reading opposite the reading window 91 and in the other set of type, in the position B for printing. This position is at the lower part of the disc on the vertical axis.

IV. Release of the carriage and slide

At the end of the movement of the cylinder 24, a cam 112 (Fig. 6) fitted to the bearing 57 at the left end of the shaft 27 lifts the rod 113, which works the grooved shaft 102 in which the releasing fork with arms 100, 101, slides, and which is moved along between the two sides 95' of the carriage 95, the said releasing fork thus being given an oscillating motion.

Owing to the pull exerted by the pull cord 31 on the carriage 95, one of the arms 100, 101 is in contact with a tooth of the rack 105 which acts as a stop piece. In the first phase of oscillation, the other one of the arms 100, 101 in contact with the rack, is released in the second phase of oscillation. The release produced corresponds with the thickness of a disc 20.

The carriage 95 is driven in the direction of the writing by the driving drum 104, which draws the pull cord 31. The latter 31 passes by a reversed movement into the inside of the shaft 27 and also moves the slide 29 into the same position, in relation to the discs 20, as the carriage 95.

The pull cord 31 is kept taut by the winding drum 111.

At the moment when the catch 33 of the slide 29 enters, at the end of the movement of the cylinder 24, acted on by the spring, into the notch 36 of the next disc, the knife 94 penetrates the toothing of the rack 93 and rectifies the position of the slide 29 exactly in relation to that of the carriage 95.

V. Automatic disengagement

At the end of the stroke of the cylinder 24 the engaging catch 80 again comes into contact with the lever 73 the end of which comes into the conical notch 85, thus making the catch 81 retract so that the driving pulley will freely rotate.

At this moment, the five necessary movements to bring the required type into position for printing are accomplished, and everything is ready to begin the operations for selecting a new type.

The other operations for working the machine are as follows:

Spacing from disc to disc

Spacing without composition is made by pressing the space bar 115 of the keyboard which works, through the intermediary of the shaft 118 and connecting rod 119, the grooved shaft 102, the latter actuating, on the one hand, the releasing device 100, 101, of the carriage 95, and, on the other, through the aid of the lever 120², the rod 120' and the flange 120 of the push rod 60 lodged in the arm 59 of the bearing 57 situated on the left of the machine, acting on the device 56, 55, 53 to retract the catch 33 to allow the transversal run of the slide 29.

Free run of the carriage 95 and slide 29

The free run of the carriage 95 and slide 29 is produced by pressing the hand levers 123, 121, fitted to the carriage 95. The lever 121 works the shaft 102, which acts on the releasing device 100, 101 and the device disengaging the catch 33 of the slide 29. This allows the carriage 95 and slide 29 to move freely as required by the operator.

Tabulation

To obtain a specified tabulation, it is sufficient to press the proper key 213. By means of the levers (of variable length) 216, which act on the common hinging 219, the levers 220, 221, 222, 224; the key 213 regulates the advance of the tabulating carriage 25 for a length fixed by the depressed key.

When the action of the push rod 60 is finished, the catch rises under the action of the spring 33 and releases the rack 133 which is drawn back by the spring 50'.

After this advance of the tabulating carriage 225, one of the stops 229 on the rack 228, the length of each of which increases from left to right and corresponds with the key 213 which is pressed, enters the path of the stop piece 230 of the carriage 95 and makes the latter stop at a specified place and, therefore, also stops the slide 29.

The advance of the carriage 95 is made under the action of the shaft 215 connected with the keys 213. The keys on the left side of the keyboard work, by means of the connecting rod 215', the releasing device of the carriage 95 and slide 29 through the shaft 102.

This series of operations enables direct tabulation from one position to the next and also tabulation in passing directly from one position to any other required.

Decimal tabulation

Other stops 229 of variable length placed side by side in the form of stops, each corresponding to one of the tabulating keys 213, serve for decimal tabulation each stop corresponding to a specific decimal. The keys 213 consequently serve both for the tabulation of the columns and decimal tabulation.

Obliteration of the composition

In the starting position, the discs 20 (not composed) are held by the pull of the spring cylinders 39, against the brake forming a stop. This tensile stress also gives compensation in the opposite direction to the tension of the slide 29.

The composition can be obliterated in three special cases viz:—
1. Total obliteration before printing.
2. Total obliteration after printing.
3. Individual obliteration.

Total obliteration before printing

To obtain total obliteration before printing, it suffices, after bringing the carriage 25 into the starting position, by means of the free stroke lever 121, to press the key 141 thus, through the intermediary of a set of connecting rods 142, 144, 145 actuating the cam shaft 146 which passes through the machine and simultaneously raises all the locking levers 126 engaging in the stop notches 129, so as to release the discs 20.

Thus released, the discs 20 give way to the traction of the spring cylinders 39 placed inside the discs, until the moment when they engage the brake 149 which stops them in normal position.

Obliteration after printing

After printing, and with the object of composing a new line, obliteration of the composition is made by the combined movement of the cam shaft 146 and return of the carriage 95 and slide 29 as described later.

Individual obliteration

Individual obliteration is made with the correction key 153, which makes three movements through the intermediary of a crank 154, a connecting rod 155 and a crank 156, of a connecting rod 158 producing, on the one hand a backward movement of the carriage 95, displacement of a disc 20, and, on the other hand, the return of the disc to the starting position.

The first movement works, by the tipping of the grooved shaft 102, thus releasing the system of the carriage 95 and slide 29.

The second movement causes the return, for the width of a disc 20, of the carriage 95, by the action of the winding drum 111 and the pull cord 31 with a pawl 172 which engages in the toothing 162 of the drum 111.

The third movement works, through the lever 156 and the connecting rod 158, the groove shaft 184 which acts as a guide for the sliding cam 185 driven between the sides of the carriage 95.

The cam 185 makes one of the locking levers 126 swing, the said lever engaging in its stop notch 129 and releasing, if necessary, the corresponding disc 20 which recoils to its starting point under the action of traction by its spring cylinder 39.

The transmission of motion governed by the set of rods 154, 155, 156, 158 is shown in Figs. 14 and 15.

These three operations being finished, the operator merely has to bring down the corresponding key to obtain the type corrected.

Laying repetitions

To repeat an isolated character in one or more words it is sufficient to press the key 192 while composing with the keys 42, the characters to be repeated later. By pressing the key 192, the lever 197 furnished with a hook 197' is brought down by means of the set of levers 193, 194, 195, 196. The hook 197' places itself in front of the hooking roller 201 of the lever 202. The grooved shaft 139 transmits to the said lever 202 the oscillating motion governed by the lever 136 of the locking device worked by the bearing 57 on the right of the machine, and which is acted upon at each descent of a composing key 42.

The said oscillating motion is transmitted by the roller 201 of the lever 202 and, through the connecting rod 197 and lever 199, makes the grooved shaft 200 tip, working the sliding cam 203 moving between the sides 95' of the slide 95 and pushes one of the stop latches 189 and releasing the corresponding locking catch 186.

Thus each disc 20 which forms a part of the combination for repetition on the next lines remains locked when the remaining discs 20 are again freed under the action of the transversal cam 146 at total cancellation by impression or with the key 141.

*Cancellation of repetitions*

To cancel a repetition, it suffices to press one of the keys 204 which work the cams 210 by means of the set of levers 209—208, 207, 206, 205. The cams 210, which are fitted one in the other, raise one of the levers 211 which carry interchangeable plates 212 of the required length and make the locking latches 186 swing, thus releasing a specified number of discs 20 in repetition, the number corresponding to the width of the plates 212.

The keys 204, and the plates 212 unlock the repetition setting of a number of discs corresponding to the width of a column measured by the prescribed forms of accountancy.

*Table for marking the columns in the prescribed forms for account*

The marking of the columns in the prescribed forms or other printed matter, utilized for work which can be done on the machine is made in the reading window 91'. This reading is done by turning with a knob, the toothed wheel 234, which works the drums 231. A paper band 233 is wound on these drums upon which line by line each speciment is printed, showing the test of the heading of the form columns which can be utilized or any other printing model.

The knob for turning may be graduated, the graduations corresponding with those on the paper band.

*Marking indicators for advance of the carriage*

When the carriage 95 advances, the marking finger 235 placed on the carriage 95 serves to register the position in forward movement of the carriage 95, in the reading windows 91 and 91'.

*Addition and subtraction of figures*

The addition of vertical columns of figures by known totalizators is made by means of the following device for transmission, which, figure by figure, works the wheelwork of the totalizators 236. By pressing one of the keys 248, 249 through the aid of the set of connecting rods 250 to 256 the grooved shaft 247 makes the oscillating frame 246 tip. The frame 246 is driven between the sides 95' of the carriage 95, the toothed wheels 242 or 243 of which, with one of the toothed wheels 239 which drives the corresponding toothed wheel 237, being in continual contact with the corresponding disc 20.

When the disc 20 is brought into the position for composition it draws in its movement, by means of the toothed wheels 237, 239, 242 or 243 and 245, the corresponding unit of the wheelwork 240 of the totalizator 236, and this gives the addition and subtraction.

Addition or subtraction is respectively made by the key 248 or 249 reversing the movement of the wheels 237 and 239 transmitted to the totalizator 236 by the frame 247.

*Final operations*

Printing and then obliteration. The printing key 258 produces a series of movements which are, successively 1. Gearing with the motor.
2. Approach of the support to the line of print of the discs.
3. Printing the composed line.
4. Descent of the paper support to its position of rest.

Then:

5. Advance of the paper support one line.
6. Return of the carriage and slide to the starting position.
7. Total obliteration of the discs except repetition.
8. Advance of the inked ribbon.

*I. Gearing with motor*

The coupling 261 (same type as 75) is driven by the bevel pinion 265 coupled with the bevel pinion 265' which is fixed on the shaft 265 operated by the motor 90 by means of a helicoidal pinion 266 in mesh with an endless screw 267 fitted on the motor shaft.

Rotary motion is transmitted to the mechanism of the lower frame by two pinions 268, 269 one of which is fixed to the coupling 261 and the other is keyed on the shaft 270 working all the lower mechanism.

*II. Approach of the support to the line of print*

The cam 271 fixed on the shaft 270 drives the connecting rod 272 which is connected to the cams 275 lifting the frame 5 of the paper support 6, thus conveying the documents into contact with the composed line of type in the position B.

*III. Printing the documents*

The pinion 277 fixed to the shaft 270 engages with the pinion 278 fixed on the shaft with cams 279—280.

The cams 280 bring the hammers 281 down, the hammers being hinged on the axis 282. They strike the back of the documents through the pliant support 6 placed between them and the surface struck by the hammers, the latter falling back on the rubber stop piece 283 in the axis of the line of composed type B.

*IV. Descent of the paper support 5 to its position of rest*

Printing being finished, the cam 271 ceases to act on the connecting rod 272, the support under the action of the springs 12 falling back to its initial position.

*V. Advance of the paper support*

Advance of this support is made by means of an eccentric 284 (Fig. 3) fitted on the shaft 270 on the opposite side to the pinion 269. The rear drum 9 of the paper support is driven by the collar 285 of the eccentric through a connecting rod 286, the position of which is adjustable (fixed in the collar 285 with a locking screw 287) and a system of pawl 288 and ratchet 289 similar to the pawl 170, 172 and rack 162 of the cord drum 111, shown in Fig. 15.

The eccentric 284 is fitted on the shaft 270 by means of a device allowing regulation of its stroke. For this it is provided with a guide slot 290 in which moves a slide 291, keyed on the shaft 270. The position of the slide in relation to the eccentric which regulates the stroke thereof, can be changed by reversing a cam 292 engaging with one side or the other of the far sides of the window 290, fitted with rough friction to the shaft 270, so that it can be turned back on the shaft by hand by means of a suitable knob.

*VI. Return of the carriage and slide to their original positions*

One of the two cams 293 (fitted on the shaft 262 on the side opposite to the coupling 263' to which it is fixed) works the releasing device 100—101 through one of the two levers 294 of the pull 296 and lever 297 thus releasing the transversal run of the carriage 95 and slide 29 by the action of the grooved shaft 102.

Simultaneously, a bevel pinion 305 works the winding of the tape 31 on the drum 111 by means of the bevel pinion 306, the shaft 307, the universal joint 308 and the bevel transmission gear 304 and 303.

The drum 111 is provided with a coupling worked by the cam 300 and the lever 301 coupled with the connecting rod 296, thus assuring synchronism in the movements for coupling of the drum and release of the carriage 95 and slide 29. The carriage 95 returning to its starting point, impinges on the catch 312 (Fig. 16' and 17) which releases the lever 301, disengagement thus being automatic.

The carriage 95 draws with it, in its return motion, the slide 29 by means of the tape 31.

*Total cancellation except repetition*

One of the two cams 293 (inner surface) works the cam 146 through one of the levers 294 of the connecting rod 144 and the lever 145. The cam 146 makes the locking catches 126 swing, and this releases all the discs 20 except those locked by the repetition device.

The discs 20 return to the starting position under the action of the spring cylinders 39.

*Advance of the ribbon*

The inking ribbon 313 moves horizontally through the machine and enters the line of the printing type B and the striking position of the hammers 281, the said ribbon being wound at both ends, with a system of advance, by known racks, on drums 316.

*Recoil of the machine*

If the composition of the next line of writing does not need a change of account papers, the continuation of the operations of composition and printing can simply be continued without displacing the machine.

If, on the contrary, the next line of writing necessitates a change of the account papers which are mounted the document holder frame 6, the machine is run back by any suitable means to the starting position, uncovering the documents and automatically releasing the nipper 10, impinging on arriving at the rear, on the stop-piece 17 behind the bar 15 furnished with the cams 16.

Numerous alterations of details might be made in the construction of this calculating machine without detriment to the principle of the invention.

Thus for example:

1. The carbon sheets could be placed in a transversal position in form of ribbons.

2. These ribbons could be wound with advantage on a drum on the outside of the left side of the frame 13 in such a way that they could move above the paper support 6 one over the other.

With this form of construction it would be possible to use continuous paper formats and doubles preferably placed in the front on a set of rolls or fan shaped and driven lengthwise by driving rolls.

3. The winding device 231 to 234 could be connected and worked automatically by the propelling device 284 to 292 of the paper support 6.

This device 284 to 292 could be provided with a tabulating appliance furnished with springs giving automatic advance of the paper support 6, with variable intervals fixed by stop-pieces.

4. The free run of the paper support 6 could be obtained with a working knob fitted to the axis of the front drum 9 which, through the intermediary of a suitable member, could release the rack 289 of the pawl 288.

5. The motor 90 could be placed in the table supporting the combination of the machine and connected with the driving pulley 82 by a belt preferably kept tight during the to-and-fro motion of the composing frame 4 with any suitable system of tighteners.

6. The free run of the carriage 95 and the slide 29 could be controlled by a lever arm or key of a keyboard which could work them by means of a cable and a set of connecting rods for example.

7. Each line could be printed with one bar or a system of one or more rollers, acting by pressure on the under part of the paper support 6.

8. The connecting appliance 241 and 246 between the totalizers 236 and the type discs 20 can be altered so as to enable transmission of the rotary motion of the disc 20 to a totalizator carried on the carriage 95 itself to register the group of figures horizontally.

9. The same result could be preferably obtained with a toothed wheel sliding between the two extreme decimals of the range of the totalizator to register the groups of figures horizontally, the said wheel being fitted on the grooved axis 247 at the place itself situated under the said totalizator.

The writing machine of the invention could also be used as a printing press by making suitable alterations.

I claim:

1. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, and means actuated by the operation of said keys for successively clutching said discs to said shaft.

2. In a typewriting machine, a shaft, a series of narrow discs mounted side by side on said shaft and each provided with a set of printing characters, said discs being each rotatable through a selected arc to bring a selected character into printing position, means to successively rotate the discs to the selected printing positions, a releasable latch mechanism for each disc operable upon positioning of the disc to engage and hold it in printing position, means urging said discs to normal positions out of all printing positions, means to release said latch mechanism, a second set of latches each engageable with a respective disc to hold it in printing position, said second set of latches having restraining means and being normally restrained thereby from engagement with said discs, manually controlled means for selectively actuating the said restraining means to effect selective release of the restrained latches to permit them to engage and latch said discs against movement, and other manually controlled means for selectively releasing the latches of the second set from the discs and restoring them to restraining positions.

3. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, and stop mechanism for the discs operable by the actuation of a respective type key to unclutch the respective disc from the shaft upon the type corresponding to the actuated key being brought to printing position.

4. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a set of latches each positioned to engage a respective disc and hold it against rotation, restraining means for said latches, and means for succesively actuating the restraining means to release the latches for engagement with the discs upon completion of the successive key actuations.

5. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a set of latches each positioned to engage a respective disc and hold it against rotation, restraining means for said latches, means for successively actuating the restraining means to release the latches for engagement with the discs upon completion of the successive key actuations, a second set of latches each engageable with a respective disc to prevent rotation thereof, a second set of restraining means holding the latches of the second set normally out of engagement with their discs, and key controlled means for selectively releasing the restraining means.

6. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a set of latches each positioned to engage a respective disc and hold it against rotation, restraining means for said latches, means for successively actuating the restraining means to release the latches for engagement with the discs upon completion of the successive key actuations, a second set of latches each engagable with a respective disc to prevent rotation thereof, a second set of restraining means holding the latches of the second set normally out of engagement with their discs, key controlled means for selectively releasing the restraining means, and manually controlled means for selectively releasing the latches of the second set and restoring them to restrained position.

7. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a set of latches each positioned to engage a respective disc and hold it against rotation, restraining means for said latches, means for successively actuating the restraining means to release the latches for engagement with the discs upon completion of the successive key actuations, a second set of latches each engageable with a respective disc to prevent rotation thereof, a second set of restraining means holding the latches of the second set normally out of engagement with their discs, key controlled means for selectively releasing the restraining means, manually controlled means for selectively releasing the latches of the second set and restoring them to restrained position and including means for releasing the latches individually, and means for simultaneously releasing a selected group of said latches.

8. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, a motor, a clutch driven by the motor for clutching and unclutching the motor and shaft, and means operated by the actuation of the type keys for effecting actuation of said clutch.

9. In a typewriting machine, a shaft, a series of narrow discs mounted side by side on said shaft, and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a motor, a clutch driven by the motor for clutching and unclutching the motor and shaft, means operated by the actuation of said keys for effecting clutching of said clutch, and means operated by the stop mechanism for effecting unclutching of said clutch.

10. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a set of latches each positioned to engage a respective disc and hold it against rotation, restraining means for said latches, means for successively actuating the restraining means to release the latches for engagement with the discs upon completion of the successive key actuations, a motor, a clutch driven by the motor for clutching and unclutching the motor and shaft, means operated by the actuation of said keys for effecting clutching of said clutch, and means operated by the stop mechanism for effecting unclutching of said clutch.

11. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a set of latches each positioned to engage a respective disc and hold it against rotation, restraining means for said latches, means for successively actuating the restraining means to release the latches for engagement with the discs upon completion of the successive key actuations, a second set of latches each engageable with a respective disc to prevent rotation thereof, a second set of restraining means holding the latches of the second set normally out of engagement with their discs, key controlled means for selectively releasing the restraining means, a motor, a clutch driven by the motor for clutching and unclutching the motor shaft, means operated by the actuation of said keys for effecting clutching of said clutch, and means operated by the stop mechanism for effecting unclutching of said clutch.

12. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spaced keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a set of latches each positioned to engage a respective disc and hold it against rotation, restraining means for said latches, means for successively actuating the restraining means to release the latches for engagement with the discs upon completion of the successive key actuations, a second set of latches each engageable with a respective disc to prevent rotation thereof, a second set of restraining means holding the latches of the second set normally out of engagement with their discs, key controlled means for selectively releasing the restraining means, manually controlled means for selectively releasing the latches of the second set and restoring them to restrained position, a motor, a clutch driven by the motor for clutching and unclutching the motor and shaft, means operated by the actuation of said keys for effecting clutching of said clutch, and means operated by the stop mechanism for effecting unclutching of said clutch.

13. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a set of latches each positioned to engage a respective disc and hold it against rotation, restraining means for said latches, means for successively actuating the restraining means to release the latches for engagement with the discs upon completion of the successive key actuations, a second set of latches each engageable with a respective disc to prevent rotation thereof, a second set of restraining means holding the latches of the second set normally out of engagement with their discs, key controlled means for selectively releasing the restraining means, manually controlled means for selectively releasing the latches of the second set and restoring them to restrained position, including means for releasing the latches individually, means for simultaneously releasing a selected group of said latches, a motor, a clutch driven by the motor for clutching and unclutching the motor and shaft, means operated by the actuation of said keys for effecting clutching of said clutch, and means operated by the stop mechanism for effecting unclutching of said clutch.

14. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, a key traveling along said shaft and adapted to be brought into successive keying engagement with said discs, means urging said key along the shaft, and an escapement mechanism associated with the last mentioned means to cause step by step movement of the key.

15. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, a key traveling along said shaft and adapted to be brought into successive keying engagement with said discs, means urging said key along the shaft, an escapement mechanism associated with the last mentioned means to cause step by step movement of the key, and stop mechanism for the discs operable by the actuation of a respective type key to unclutch the respective disc from the shaft upon the type corresponding to the actuated key being brought to printing position.

16. In a typewriting machine, a shaft, a series of narrow discs mounted side by said on said shaft and each provided with a set of printing characters, said discs being each rotatable from normal position through a selected arc to bring a selected character into printing position, means to rotate said shaft, a bank of type and spacer keys, a key traveling along said shaft and adapted to be brought into successive keying engagement with said discs, means urging said key along the shaft, an escapement mechanism associated with the last mentioned means to cause step by step movement of the key, stop mechanism for the discs operable by the actuation of a respective type key to unclutch the respective disc from the shaft upon the type corresponding to the actuated key being brought to printing position, a motor, a clutch driven by the motor for clutching and unclutching the motor and shaft, means operated by the actuation of said keys for effecting clutching of said clutch, and means operated by the stop mechanism for effecting unclutching of said clutch.

17. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, a key traveling along said shaft and adapted to be brought into successive keying engagement with said discs, means urging said key along the shaft, an escapement mechanism associated with the last mentioned means to cause step by step movement of the key, stop mechanism for the discs operable by the actuation of a respective type key to unclutch the respective disc from the shaft upon the type corresponding to the actuated key being brought to printing position, a motor, a clutch driven by the motor for clutching and unclutching the motor and shaft, means operated by the actuation of said keys for effecting clutching of said clutch, means operated by the stop mechanism for effecting unclutching of said clutch, and means operatively connecting the key and stop mechanism to effect disengagement of the key from the respective disc upon operation of said stop mechanism.

18. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, a key traveling along said shaft and adapted to be brought into successive keying engagement with said discs, means urging said key along the shaft, an escapement mechanism associated with the last mentioned means to cause step by step movement of the key, stop mechanism for the discs operable by the actuation of a respective type key to unclutch the respective disc from the shaft upon the type corresponding to the actuated key being brought to printing position, a motor, a clutch driven by the motor for clutching and unclutching the motor and shaft, means operated by the actuation of said keys for effecting clutching of said clutch, means operated by the stop mechanism for effecting unclutching of said clutch, means operatively connecting the key and stop mechanism to effect disengagement of the key from the respective disc upon operation of said stop mechanism, a set of latches each positioned to engage a respective disc and hold it against rotation, restraining means for said latches, and means for successively actuating the restraining means to release the latches for engagement with the discs upon completion of the successive key actuations.

19. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, a key traveling along said shaft and adapted to be brought into successive keying engagement with said discs, means urging said key along the shaft, an escapement mechanism associated with the last mentioned means to cause step by step movement of the key, stop mechanism for the discs operable by the actuation of a respective type key to unclutch the respective disc from the shaft upon the type corresponding to the actuated key being brought to printing position, a motor, a clutch driven by the motor for clutching and unclutching the motor and shaft, means operated by the actuation of said keys for effecting clutching of said clutch, means operated by the stop mechanism for effecting unclutching of said clutch, means operatively connecting the key and stop mechanism to effect disengagement of the key from the respective disc upon operation of said stop mechanism, a set of latches each positioned to engage a respective disc and hold it against rotation, restraining means for said latches, means for successively actuating the restraining means to release the latches for engagement with the discs upon completion of the successive key actuations, a second set of latches each engageable with a respective disc to prevent rotation thereof, a second set of restraining means holding the latches of the second set normally out of engagement with their discs, and key controlled means for selectively releasing the restraining means.

20. In a typewriting machine, a hollow driving shaft, a series of type discs mounted side by side for independent revolution about said shaft, a traveller moving within said shaft and arranged to key the type discs successively and releasably to said shaft, means connected to the traveller and producing a step by step movement of the traveller along the shaft, a position controlling arm revolubly mounted on said shaft, means to drive said arm, means to lock the arm releasably to the shaft, release means carried by the arm and connected to the arm lock, a bank of type keys, a series of release stops adjacent the path of said release means and movable into and out of said path, each of said stops having operative connection with a respective type key to effect movement of the stop into said path upon depression of the key, the engagement of a projected stop by said release means effecting release of said arm, a set of type on the periphery of each disc having printing positions corresponding to the positions of the disc upon release of the arm by the action of respective stops, and releasable latch means to latch each disc in printing position upon operation of the release means.

21. In a typewriting machine, a shaft, a series of narrow discs mounted side by side on said shaft and each provided with a set of printing characters, said discs being each rotatable through a selected arc to bring a selected character into printing position, means to successively rotate the discs to the selected printing positions, a releasable latch mechanism for each disc operable upon positioning of the disc to engage and hold it in printing position, means urging said discs to normal positions out of all printing positions, means to release said latch mechanism, a second set of latches each engageable with a respective disc to hold it in printing position, said second set of latches having restraining means and being normally restrained thereby from engagement with said discs, manually controlled means for selectively actuating the said restraining means to effect selective release of the restrained latches to permit them to engage and latch said discs against movement, each of said discs having a second set of characters thereon, a casing for said discs, and a window in said casing positioned to expose that character of the second set on a disc corresponding to the character in printing position of the same disc.

22. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, means to support paper and a ribbon opposite the printing position of said discs, a hammer mechanism opposite said printing position, and means to effect operation of said hammer mechanism to cause the ribbon and paper to be driven agains the composed printing characters of the discs.

23. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, a motor, a clutch driven by the motor for clutching and unclutching the motor and shaft, means operated by the actuation of said keys for effecting clutching of said clutch, means operated by the stop mechanism for effecting unclutching of said clutch, means to support a ribbon and paper opposite the printing position of the disc characters, a hammer mechanism for forcing said ribbon and paper against the composed line of printing characters, gearing connecting said motor and hammer mechanism and including a normally open clutch, and manually controlled means for effecting closure of the last mentioned clutch and thereby operation of the hammer mechanism.

24. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, means to support paper and a ribbon opposite the printing position of said discs, a hammer mechanism opposite said printing position, means to effect operation of said hammer mechanism to cause the ribbon and paper to be driven against the composed printing characters of the discs, and means to advance the discs and all of the mechanisms associated therewith one line downwardly of the ribbon and paper upon completion of the operation of the hammer mechanism.

25. In a typewriting machine, a shaft, a series of narrow discs mounted side by side on said shaft and each provided with a set of printing characters, said discs being each rotatable from normal position through a selected arc to bring a selected character into printing position, means to rotate said shaft, a bank of type and spacer keys, means actuated by the operation of said keys for successively clutching said discs to said shaft, stop mechanism for the discs operable by the actuation of a respective type key to unclutch the respective disc from the shaft upon the type corresponding to the actuated key being brought to printing position, means to support paper and a ribbon opposite the printing position of said discs, a hammer mechanism opposite said printing position, means to effect operation of said hammer mechanism to cause the ribbon and paper to be driven against the composed printing characters of the discs, and means driven by said shaft rotating means to advance the discs and all of their associated mechanisms one line downwardly of the paper upon completion of the operation of the hammer mechanism.

26. In a typewriting machine, a shaft, means to rotate the shaft, a series of narrow discs mounted side by side on said shaft and each provided with a set of printing characters, said discs being each rotatable from normal position through a selected arc to bring a selected character into printing position, a second set of like characters on each disc corresponding in arrangement to the printing characters, a casing having a transverse window therein through which the character of the second set corresponding to the character in printing position is visible, means traveling longitudinally of the shaft and clutching the discs to the shaft successively, and a pointer operatively connected to the last mentioned means and moving therewith along said window in synchronism with said last means to indicate the disc in clutched relation to the shaft.

27. In a typewriting machine, a frame, a paper support carried by said frame, a printing device movable longitudinally of the frame, vertically liftable paper clamps at the sides of the frame, and a camming mechanism operating on the paper clamps to lift the clamps upon rearward movement of the camming mechanism, said camming mechanism being engaged by a part of the printing device upon rearward movement of the latter to effect rearward movement of the camming mechanism.

28. In a typewriting machine, a rotatable shaft, a series of printing discs arranged side by side on said shaft, a series of printing characters on each disc, a platen, said discs cooperating with said platen and being normally in non-printing position relative thereto, means to rotate said shaft, means to successively key the discs to the shaft to effect rotation of the discs to printing positions relative to the shaft, spring means urging said discs to normal position on said shaft, pawls holding said discs in printing positions, a carriage traversing said series of discs and having a normal position at one end of the series of discs, and means on said carriage engaging said pawls to release the same upon movement of the carriage towards its normal position from a position out of normal.

29. In a typewriting machine, a rotatable shaft, a series of printing discs arranged side by side on said shaft, a series of printing characters on each disc, a platen, said discs cooperating with said platen and being normally in non-printing position relative thereto, means to rotate said shaft, means to successively key the discs to the shaft to effect rotation of the discs to printing positions relative to the shaft, spring means urging said discs to normal position on said shaft, pawls holding said discs in printing positions, a carriage traversing said series of discs and having a normal position at one end of the series of discs, means on said carriage engaging said pawls to release the same upon movement of the carriage towards its normal position from a position out of normal, a keyboard including a back-spacer key, and means actuated by the back-spacer key and effecting step by step movement of said carriage toward its normal position when displaced therefrom.

30. In a typewriting machine, a shaft, means to rotate the shaft, a series of narrow discs mounted side by side on said shaft and each provided with a set of printing characters, said discs being each rotatable from normal position through a selected arc to bring a selected character into printing position, a second set of like characters on each disc corresponding in arrangement to the printing characters, a casing having a transverse window therein through which the character of the second set corresponding to the character in printing position is visible, means traveling longitudinally of the shaft and clutching the discs to the shaft successively, a pointer operatively connected to the last mentioned means and moving therewith along said window in synchronism with said last means to indicate the disc in clutched relation to the shaft, said casing having a second window parallel to the first window and across which said pointer traverses, and means in said casing to support a copy sheet and including means to feed the copy sheet across the second window to present successive lines, said means being arranged to support the copy sheet in position to be traveled over by said pointer.

31. In a typewriting machine, a shaft, a series of narrow discs mounted side by side on said shaft and each provided with a set of printing characters, said discs being each rotatable through a selected arc to bring a selected character into printing position, means to successively rotate the discs to the selected printing positions, a releasable latch mechanism for each disc operable upon positioning of the disc to engage and hold it in printing position, means urging said discs to normal positions out of all printing positions, means to release said latch mechanism, a second set of latches each engageable with a respective disc to hold it in printing position, said second set of latches having restraining means and being normally restrained thereby from engagement with said discs, and manually controlled means for selectively actuating the said restraining means to effect selective release of the restrained latches to permit them to engage and latch said discs against movement.

MAX EMILE HAUSHEER.